(12) United States Patent
Cho

(10) Patent No.: US 10,018,877 B2
(45) Date of Patent: Jul. 10, 2018

(54) LIQUID CRYSTAL DISPLAY DEVICE

(71) Applicant: LG Display Co., Ltd., Seoul (KR)

(72) Inventor: Sung Hyun Cho, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/640,482

(22) Filed: Mar. 6, 2015

(65) Prior Publication Data

US 2015/0253607 A1    Sep. 10, 2015

Related U.S. Application Data

(60) Provisional application No. 61/949,109, filed on Mar. 6, 2014.

(30) Foreign Application Priority Data

Jun. 23, 2014    (KR) .......................... 10-2014-0076695

(51) Int. Cl.
*G02F 1/1339*    (2006.01)
*G02F 1/1337*    (2006.01)

(52) U.S. Cl.
CPC ........ *G02F 1/13394* (2013.01); *G02F 1/1337* (2013.01); *G02F 2001/13396* (2013.01); *G02F 2001/13398* (2013.01); *G02F 2201/50* (2013.01)

(58) Field of Classification Search
CPC .. G02F 1/13394; G02F 1/1337; G02F 1/1339; G02F 1/133345; G02F 1/133512; G02F 2001/13396; G02F 2001/13398; G02F 2001/133738; G02F 2001/133776; G02F 1/136209; G02F 2001/133311; G02F 2201/50; H01L 27/124; H01L 27/1248; G02B 5/223; G03F 7/0007
USPC ......................... 349/155–157, 110, 138, 123
See application file for complete search history.

(56) References Cited

U.S. PATENT DOCUMENTS

| | | | |
|---|---|---|---|
| 8,081,286 B2 * | 12/2011 | Kim | G02F 1/13394 349/106 |
| 2010/0123866 A1 * | 5/2010 | Chang | G02F 1/136286 349/141 |
| 2010/0201933 A1 * | 8/2010 | Sonoda | G02F 1/13394 349/141 |
| 2011/0222013 A1 * | 9/2011 | Kawanishi | G02F 1/1339 349/153 |
| 2013/0342782 A1 * | 12/2013 | Kim | G02F 1/13394 349/46 |

OTHER PUBLICATIONS

Definition of term "arrangement" downloaded from Merriam-Webster at https://www.merriam-webster.com/dictionary/arrangement on Jan. 9, 2017.*
Definition of term "density" downloaded from Merriam-Webster at https://www.merriam-webster.com/dictionary/density on Jan. 9, 2017.*

* cited by examiner

*Primary Examiner* — Angela Davison
(74) *Attorney, Agent, or Firm* — Fenwick & West LLP

(57) ABSTRACT

Disclosed are an apparatus and an LCD device. The apparatus includes a color filter (CF) substrate having a black matrix layer, a thin-film transistor (TFT) substrate having an alignment layer, and a structure, between said CF substrate and said TFT substrate, corresponding to certain portions of said black matrix layer and configured to protect said alignment layer from damage due to external pressure.

15 Claims, 9 Drawing Sheets

LIQUID CRYSTAL DISPLAY DEVICE

CROSS-REFERENCE TO RELATED APPLICATIONS

This application claims the benefit of the U.S. Patent Application No. 61/949,109 filed on Mar. 6, 2014; and Korean Patent Application No. 10-2014-0076695 filed on Jun. 23, 2014, which are hereby incorporated by reference as if fully set forth herein.

BACKGROUND

Field of the Invention

The present invention relates to a liquid crystal display (LCD) device including a column spacer which increases an aperture ratio and prevents light from being leaked.

Discussion of the Related Art

LCD devices are suitable as a display device for televisions (TVs) and portable devices because the LCD devices are easily manufactured due to the advance of manufacturing technology and realize drivability of a driver, low power consumption, and a high-quality image. The LCD devices adjust a transmittance of light passing through a liquid crystal layer of a pixel according to an image signal input from the outside to display an image based on the image signal.

The LCD device includes a first substrate (a thin film transistor (TFT) array substrate), a second substrate (a color filter array substrate), and a liquid crystal layer formed between the first substrate 10 and the second substrate.

In the first substrate, a plurality of data lines and a plurality of gate lines are formed to intersect each other, and a plurality of pixels are defined. A TFT which is a switching element is formed in each of the plurality of pixels.

A planarizing layer is formed to cover the TFT. The planarizing layer is formed of photo acryl (PAC) to have a thickness of 2.0 µm. A passivation layer is formed on the planarizing layer, and a first alignment layer is formed on the passivation layer.

The second substrate includes a plurality of black matrixes, a plurality of red (R), green (G), and blue (B) color filters, an overcoat layer, a plurality of column spacers, and a second alignment layer. The black matrixes are formed in correspondence with a shielding area, and the color filters are formed in correspondence with an aperture area.

SUMMARY

An aspect of the present invention is directed to provide an LCD device which can prevent an alignment layer from being damaged by a movement of a column spacer.

Another aspect of the present invention is directed to provide an LCD device which can prevent an alignment direction of an alignment layer from being changed by a movement of a column spacer.

Another aspect of the present invention is directed to provide an LCD device which can prevent light from being leaked and in which an aperture ratio is enhanced.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an apparatus including: a color filter (CF) substrate having a black matrix layer; a thin-film transistor (TFT) substrate having an alignment layer; and a structure, between said CF substrate and said TFT substrate, corresponding to certain portions of said black matrix layer and configured to protect said alignment layer from damage due to external pressure.

Said structure may include a column spacer array comprising a first group of column spacers that have a first height, a second group of column spacers that have a second height smaller than said first height; and a means that corresponds to and faces at least one among said first group of column spacers and second group of column spacers to restrict movement thereof.

Said means may include: a stopper having an upper surface in proximity to a distal end surface of one or more column spacers, said upper surface providing frictional resistance to restrict movement of said column spacers upon external pressure being applied thereto.

Said means may include: a holder having a recess capable of accommodating a distal end of one or more column spacers, said recess providing spatial containment to restrict movement of said column spacers upon external pressure being applied thereto.

Said stopper may be located above a conductive metal line on said TFT substrate, said conductive metal line being on a common electrode to reduce resistance of said common electrode.

Said holder may be located above a conductive metal line on said TFT substrate, said conductive metal line being on a common electrode to reduce resistance of said common electrode.

Said structure may further include: a third group of column spacers having a third height that is intermediate of said first height and said second height; and said means may further include: a notch or a holder capable of receiving a distal end of one or more column spacers in said third group of column spacers to restrict movement thereof upon external pressure being applied thereto.

In another aspect of the present invention, there is provided a liquid crystal display (LCD) device including: a first substrate in which a black matrix defining a shielding area and an aperture area of each of a plurality of pixels is disposed; a second substrate in which an alignment layer is disposed at a portion corresponding to the shielding area and the aperture area; a plurality of spacers disposed on one of the first and second substrates; and a plurality of means disposed on a substrate different from a substrate in which the plurality of spacers are disposed, and configured to restrict movement distances of the plurality of spacers based on external pressure.

The plurality of spacers may include a first spacer configured to maintain a cell gap between the first substrate and the second substrate, the plurality of means may include a first holder that is more convex than a top of the alignment layer disposed at the portion corresponding to the aperture area, and the convex first holder may restrict movement of the first spacer to the alignment layer, disposed at the portion corresponding to the aperture area, by the external pressure.

The plurality of spacers may include a second spacer configured to maintain a first push gap between the first substrate and the second substrate, the plurality of means may include a second holder that is more convex than the top of the alignment layer disposed at the portion corresponding to the aperture area, and the convex second holder may restrict movement of the second spacer to the alignment layer, disposed at the portion corresponding to the aperture area, by the external pressure.

The plurality of spacers may include a third spacer configured to maintain a second push gap between the first substrate and the second substrate, and the plurality of means may include a third holder that is more concave than the top of the alignment layer disposed at the portion corresponding to the aperture area. When the external pressure is applied, a portion of the third spacer may be inserted into the concave third holder, and the concave third holder may restrict movement of third spacer to the alignment layer disposed at the portion corresponding to the aperture area.

The plurality of spacers may include a second spacer configured to maintain a first push gap between the first substrate and the second substrate, and the plurality of means may include a second holder that is more concave than the top of the alignment layer disposed at the portion corresponding to the aperture area. When the external pressure is applied, a portion of the second spacer may be inserted into the concave third holder, and the concave third holder may restrict movement of the second spacer to the alignment layer disposed at the portion corresponding to the aperture area.

The plurality of spacers may include a third spacer configured to maintain a second push gap between the first substrate and the second substrate, and the plurality of means may include a third holder that is more concave than the top of the alignment layer disposed at the portion corresponding to the aperture area. When the external pressure is applied, a portion of the third spacer may be inserted into the concave third holder, and the concave third holder may restrict movement of the third spacer to the alignment layer disposed at the portion corresponding to the aperture area.

The first spacer may be narrower in width than the second spacer and may be lower in arrangement density than the second spacer.

The plurality of pixels may be arranged in the order of a blue pixel, a red pixel, and a green pixel, and the first spacer and the second spacer may be arranged in correspondence with a shielding area between the blue pixel and the red pixel.

The plurality of pixels may be arranged in the order of a blue pixel, a red pixel, and a green pixel, and the first spacer and the second spacer may be arranged in correspondence with a shielding area between the red pixel and the green pixel.

The first spacer may be narrower in width than the second spacer and may be lower in arrangement density than the second spacer.

The plurality of pixels may be arranged in the order of a blue pixel, a red pixel, and a green pixel, and the first spacer and the second spacer may be arranged in correspondence with a shielding area between the blue pixel and the red pixel.

The plurality of pixels may be arranged in the order of a blue pixel, a red pixel, and a green pixel, and the first spacer and the second spacer may be arranged in correspondence with a shielding area between the red pixel and the green pixel.

The first push gap may be greater than the second push gap.

In addition, other features and effects of the present invention can be newly construed from the embodiments of the present invention.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
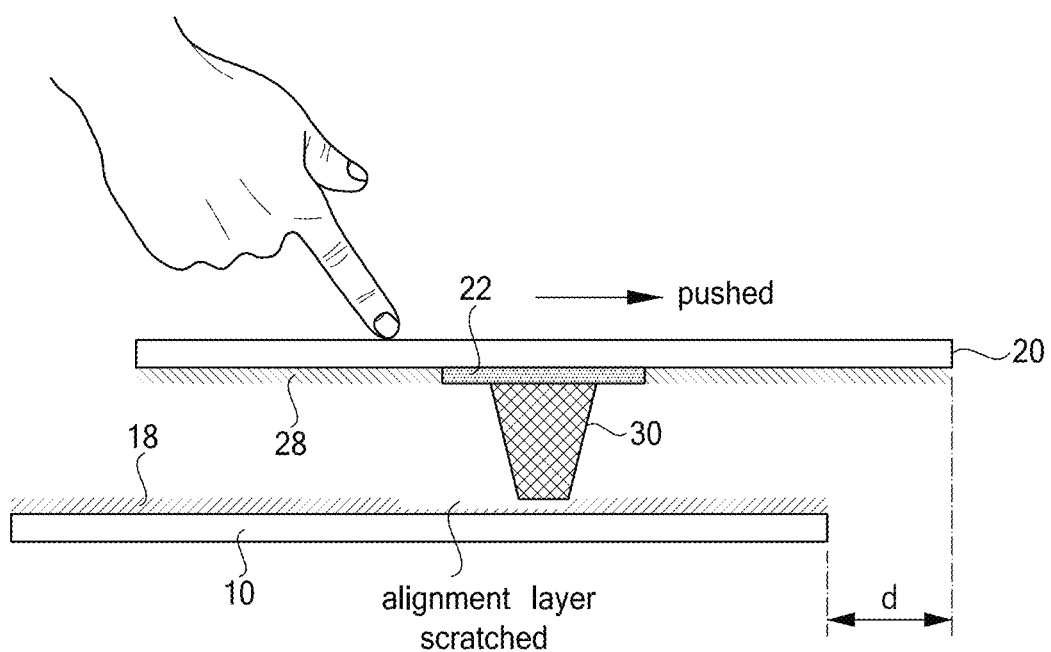
FIG. 1 is a diagram showing a phenomenon in which an alignment layer is damaged and alignment is distorted due to a movement of a column spacer in a LCD device.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover, a case where a third structure is disposed therebetween.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

FIG. 1 is a diagram showing a phenomenon in which an alignment layer is damaged and alignment is distorted due to a movement of a column spacer in a LCD device.

Referring to FIG. 1, the plurality of column spacers 30 are formed in an area, corresponding to the black matrix 22, on the overcoat layer. The plurality of column spacers 30 include a gap spacer, which maintains a cell gap between the first substrate 10 and the second substrate 20, and a push spacer that forms a push gap between the first substrate 10 and the second substrate 20. A second alignment layer 28 is formed to cover the plurality of column spacers 30. In FIG. 1, the gap spacer among the plurality of gap spacers and the plurality of push spacers is illustrated.

When a screen is touched by a finger, a pressure is applied to the LCD device, and thus, the second substrate 20 is moved, and the column spacer 30 formed on the second substrate 20 is moved. Also, when the applied pressure is released, the second substrate 20 is moved to the left to return to the original position, and the column spacer 30 formed on the second substrate 20 is also moved to the original position.

Here, the first alignment layer 18 and the second alignment layer 28 are aligned in a certain direction. However, the column spacer 30 is moved, and thus, an alignment direction is changed in an area contacting the first alignment layer 18. Also, when an external force is strongly applied, the column spacer 30 is moved, and for this reason, the first alignment layer 18 is scratched. When an alignment layer is damaged, an alignment direction is changed.

Figure 2:
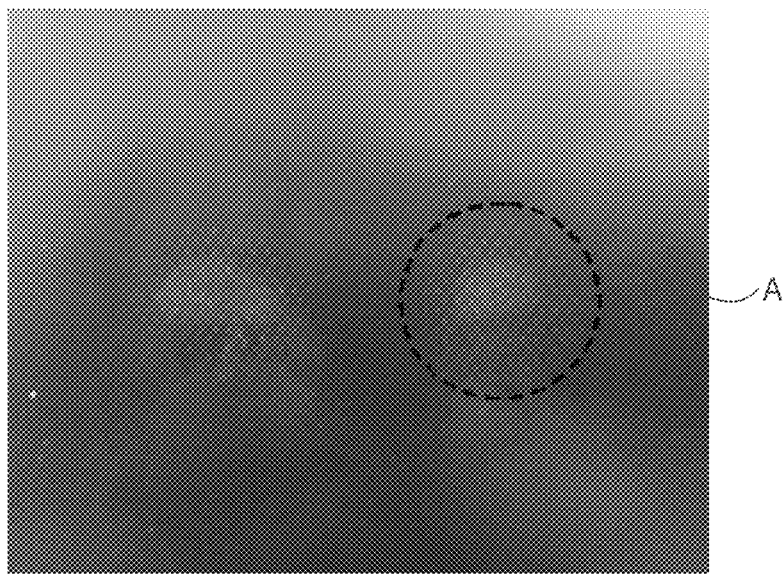
FIG. 2 is a diagram showing a light leakage caused by a scratch of an alignment layer.

FIG. 2 is a diagram showing a light leakage caused by a scratch of an alignment layer.

Referring to FIG. 2, when an alignment direction is changed because the first alignment layer 18 is scratched, liquid crystal molecules are aligned in a different direction, and thus, a transmittance of light is changed. At this time, an area in which a scratch occurs due to a contact with the first alignment layer 18 caused by a movement of the column spacer 30 is not covered by the black matrix 22, and for this reason, light leakage occurs as shown in a portion A.

In order to prevent light leakage, the column spacer 30 is moved, and thus, an area of the black matrix 22 should be enlarged to an area in which an alignment of the first alignment layer 18 is changed and an area in which the first alignment layer 18 is damaged. However, when an area of the black matrix 22 is enlarged, an aperture ratio of a pixel is lowered. That is, light leakage is reduced by broadening an area of the black matrix 22, but an aperture ratio of a pixel is lowered.

Figure 3:
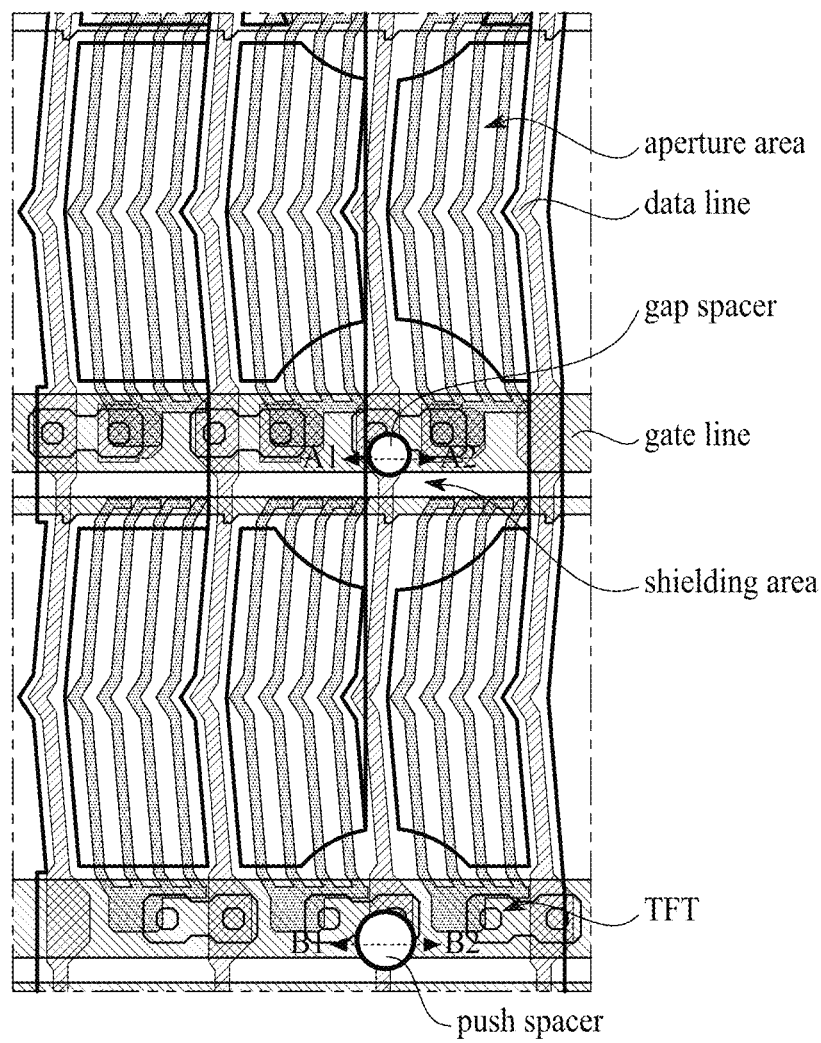
FIG. 3 is a plan view illustrating an LCD device according to a first embodiment of the present invention.
Figure 4:
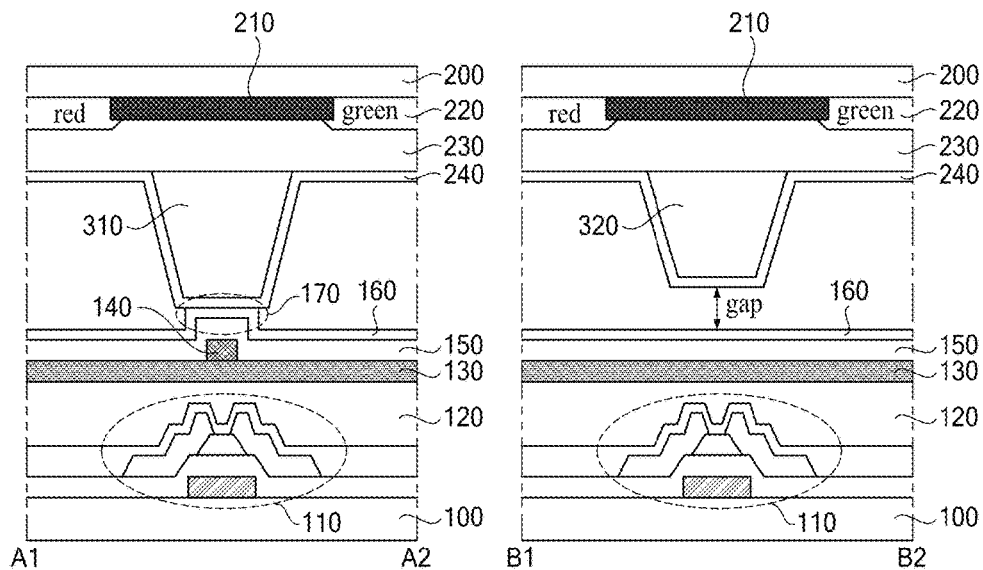
FIG. 4 is a cross-sectional view taken along line A1-A2 of FIG. 3 and a cross-sectional view taken along line B1-B2 of FIG. 3.

FIG. 3 is a plan view illustrating an LCD device according to a first embodiment of the present invention, and FIG. 4 is a cross-sectional view taken along line A1-A2 of FIG. 3 and a cross-sectional view taken along line B1-B2 of FIG. 3.

In FIG. 3, some of a plurality of pixels of the LCD device according to the first embodiment of the present invention are illustrated, and one of a plurality of gap spacers and one of a plurality of push spacers are illustrated.

Referring to FIGS. 3 and 4, the LCD device according to the first embodiment of the present invention includes a first substrate (a thin film transistor (TFT) array substrate) 100, a second substrate (a color filter array substrate) 200, and a liquid crystal layer (not shown) formed between the first substrate 100 and the second substrate 200. In FIGS. 3 and 4, a backlight unit that supplies light to a liquid crystal panel and a driving circuit unit are not illustrated.

The first substrate 100 is the TFT array substrate. An aperture area which displays an image by transmitting light and a shielding area through which the light cannot pass are formed on the first substrate 100.

In the first substrate 10, a plurality of data lines and a plurality of gate lines are formed to intersect each other, and a plurality of pixels are defined. A TFT 110 which is a switching element is formed in each of the plurality of pixels. The TFT 110 includes a gate electrode, an active layer, a source electrode, and a drain electrode. The active layer between the source electrode and the drain electrode is a channel of the TFT 110.

A planarizing layer 120 is formed to cover the TFT 110. The planarizing layer 120 is formed to a thickness 2.0 µm to 3.0 µm by coating photo acryl all over the first substrate 100. A step height of a substrate surface caused by the TFT 110 is removed by planarizing the first substrate 100 with the planarizing layer 120.

A common electrode 130 for supplying a common voltage Vcom to the pixels is formed on the planarizing layer 120. The common electrode 130 is formed of a transparent conductive material such as indium tin oxide (ITO) or indium zinc oxide (IZO). The common electrode 130 may be formed all over the first substrate 100.

A plurality of first common lines 140, which contact the common electrode 130 and are formed in the same direction as a data line, are formed on the common electrode 130. Each of the first common lines 140 is formed to have a width of 5 μm or more. The first common lines 140 may be formed in a planar structure having a circular shape, a tetragonal shape, or a diamond shape. In FIG. 4, one of the first common lines 140 is illustrated. Each of the first common lines 140 is formed to overlap a corresponding data line, and is formed of a conductive metal material having a low resistivity like copper, thereby lowering a resistance of the common electrode 130.

A passivation layer 150 is formed to cover the common electrode 130 and the first common lines 140. The passivation layer 150 is formed of an inorganic layer of $SiO_2$ or $SiN_x$. Also, the passivation layer 150 may be formed of an organic layer of an organic material in addition to an inorganic material.

Although not shown, a pixel electrode is formed on the passivation layer 150 in the aperture area, and is connected to the drain electrode of the TFT 110. A first alignment layer 160 is formed on the passivation layer 150. The first alignment layer 160 may be formed of polyimide (PI).

The passivation layer 150 and the first alignment layer 160 protrude along a profile of the first common line 140, thereby forming a step height. A projection pattern 170 is formed by the first common line 140, and is formed to have a height of 3,000 Å to 5,000 Å. A column spacer is formed on the second substrate 200 to contact the projection pattern 170 disposed on the first substrate 100.

The second substrate 200 includes a plurality of black matrixes 210, a plurality of red (R), green (G), and blue (B) color filters 220, an overcoat layer 230, a plurality of column spacers 310 and 320, and a second alignment layer 240. The black matrixes 210 are formed in correspondence with a shielding area, and the red (R), green (G), and blue (B) color filters 220 are formed in correspondence with an aperture area.

The black matrix 210 may be formed to overlap the TFT 110 formed on the first substrate (the TFT array substrate) 100, so as to minimize a reduction in an aperture area of a corresponding pixel.

The color filter 220 is formed by selectively coating and removing color pigments of red, green, and blue by using a mask, for displaying a color image.

The overcoat layer 230 is formed to cover the black matrix 210 and the color filter 220. The plurality of column spacers 310 and 320 are formed in an area, corresponding to the black matrix 210, on the overcoat layer 230.

The plurality of column spacers 310 and 320 include a gap spacer 310, which maintains a cell gap between the first substrate 100 and the second substrate 200, and a push spacer 320 that forms a push gap between the first substrate 100 and the second substrate 200. In FIG. 4, one of the plurality of gap spacers 310 and one of the plurality of push spacers 320 are illustrated.

The second alignment layer 240 is formed to cover the plurality of column spacers 310 and 320. The second alignment layer 240 may be formed of polyimide (PI).

The plurality of column spacers 310 and 320 may be formed in a planar structure having a circular shape, or may be formed in a planar structure having a bar shape. An upper end of the gap spacer 310 contacting the overcoat layer 230 may be formed to have a width of 16 μm, and a lower end of the gap spacer 310 corresponding to the projection pattern 170 may be formed to have a width of 12 μm. An upper end and a lower end of the push spacer 320 may be formed to have a broader width than that of the gap spacer 310. The gap spacer 310 and the push spacer 320 may be simultaneously formed by a single mask process using a half tone mask.

The gap spacer 310 and the push spacer 320 are formed to overlap the TFT 110 of the first substrate 100 and the black matrix 210 of the second substrate 200. The passivation layer 150 and the first alignment layer 160 protrude along the profile of the first common line 140 formed on the first substrate 100, and thus, the projection pattern 170 is formed. The gap spacer 310 is formed in correspondence with the projection pattern 170, and maintains a cell gap between the first substrate 100 and the second substrate 200. In this case, a width of an upper end of the gap spacer 310 is formed greater than that of the projection pattern 170.

The push spacer 320 may be formed to have a lower height than that of the gap spacer 310. There is no step height in a portion, where the push spacer 320 is formed, of the first substrate 100, and thus, a push gap is formed. A push gap of 5,000 Å to 6,000 Å is formed between the first substrate 100 and the second substrate 200 by the push spacer 320. When an external force is applied to the second substrate 200, the push gap prevents the liquid crystal panel from being damaged because the second substrate 200 is pushed.

Figure 5:
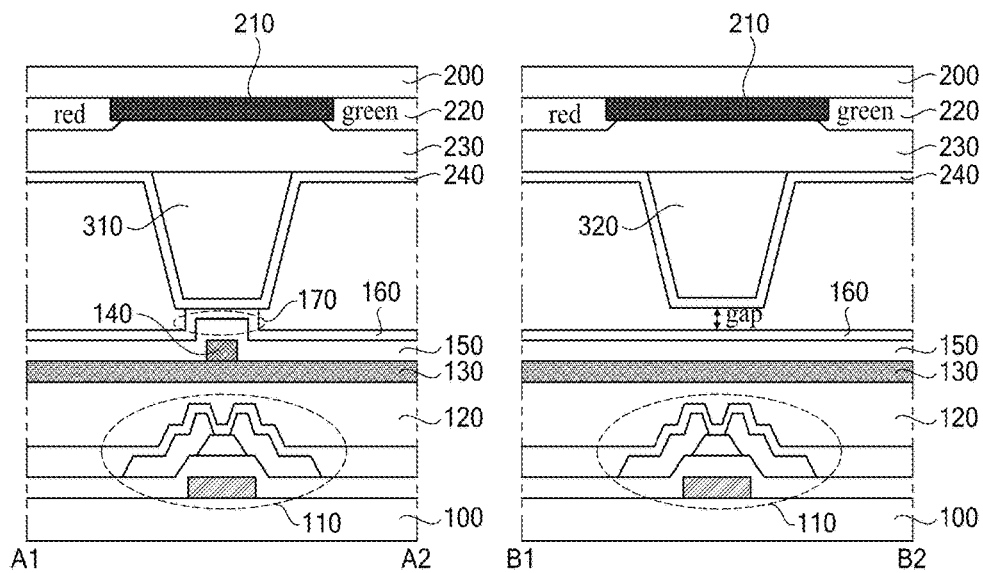
FIG. 5 is a diagram illustrating a gap spacer and a push spacer which are formed to have the same height, in the LCD device according to the first embodiment of the present invention.

FIG. 5 is a diagram illustrating a gap spacer and a push spacer which are formed to have the same height, in the LCD device according to the first embodiment of the present invention.

In FIG. 5, some of a plurality of pixels of the LCD device are illustrated, and one of a plurality of gap spacers and one of a plurality of push spacers are illustrated.

Referring to FIG. 5, the gap spacer 310 and the push spacer 320 may be formed to have the same height. In this case, the gap spacer 310 is formed in correspondence with the projection pattern 170 formed on the first substrate 100, and maintains a cell gap between the first substrate 100 and the second substrate 200. Also, there is no step height in a portion where the push spacer 320 is formed, and thus, a push gap equal to a height of the projection pattern 170 is formed.

When the projection pattern 170 of the first substrate 100 is formed to have a height of 3,000 Å to 5,000 Å, a push gap of 3,000 Å to 5,000 Å is formed between the first substrate 100 and the second substrate 200 by the push spacer 320.

Here, the first column spacer 310 and the second column spacer 320 may be disposed in correspondence with the shielding area between a blue pixel and a red pixel, but the present embodiment is not limited thereto. For example, the first column spacer 310 and the second column spacer 320 may be disposed in correspondence with a shielding area between the red pixel and a green pixel.

Although not shown, by changing a structure illustrated in FIGS. 4 and 5, the gap spacer 310 and the push spacer 320 may be formed on the first substrate 100, and the projection pattern 170 may be formed on the second substrate 200. In the LCD device according to the first embodiment of the present invention including a configuration illustrated in FIGS. 4 and 5, the passivation layer 150 and the first alignment layer 160 are stacked on the first common line 140 which is formed so as to lower a resistance of the first common electrode 130, and thus, the projection pattern 170 is formed.

The gap spacer 310 is formed on the second substrate 200 to overlap the projection pattern 170 having a narrow width, Therefore, the present invention prevents an alignment of the first alignment layer 160 and an alignment of the second alignment layer 240 from being changed in the aperture area, and prevents the first alignment layer 160 of the first substrate 100 from being damaged by a movement of the gap spacer 310, thereby preventing a light leakage.

Particularly, light is prevented from being leaked by an external force when a touch is applied, and the push spacer 320 quickly contacts a surface overlapping the TFT 110, thereby preventing the gap spacer 310 from being collapsed. Also, a smear is prevented from occurring in a portion touched by a finger, and a margin of a shielding area for reducing light leakage is improved, thereby increasing an aperture ratio.

Figure 6:
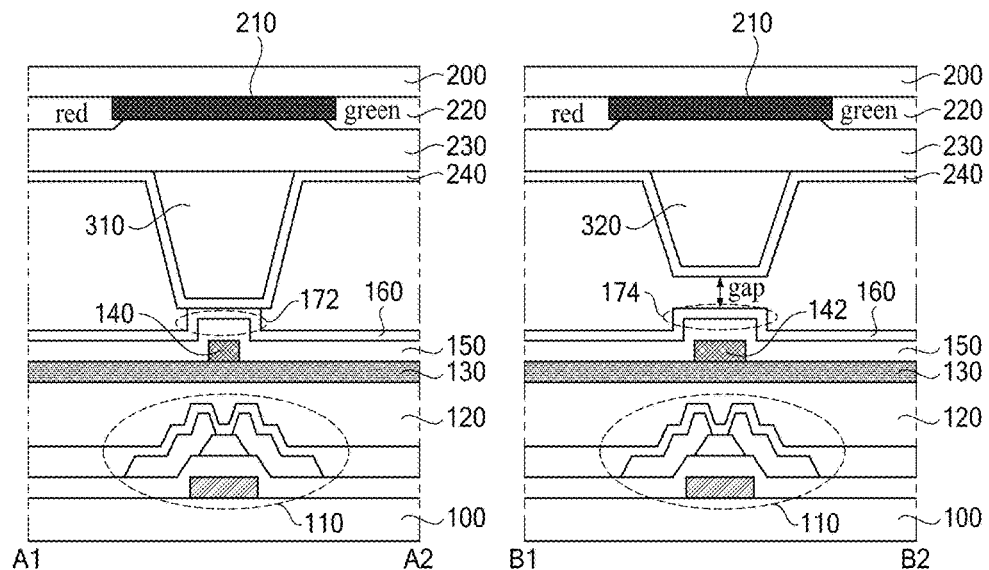
FIG. 6 is a cross-sectional view illustrating an LCD device according to a second embodiment of the present invention.

FIG. 6 is a cross-sectional view illustrating an LCD device according to a second embodiment of the present invention. A cross-sectional surface taken along line A1-A2 of FIG. 3 and a cross-sectional surface taken along line B1-B2 of FIG. 3 are illustrated in FIG. 6. In describing the LCD device according to the second embodiment of the present invention, detailed descriptions on the same elements as the above-described first and second embodiments may not be provided.

Referring to FIG. 6, the LCD device according to the second embodiment of the present invention includes a first substrate (a thin film transistor (TFT) array substrate) 100, a second substrate (a color filter array substrate) 200, and a liquid crystal layer (not shown) formed between the first substrate 100 and the second substrate 200.

A planarizing layer 120 is formed to cover a TFT 110. The planarizing layer 120 is formed to a thickness 2.0 μm to 3.0 μm by coating photo acryl all over the first substrate 100.

A common electrode 130 for supplying a common voltage Vcom to the pixels is formed on the planarizing layer 120. The common electrode 130 is formed of a transparent conductive material such as indium tin oxide (ITO) or indium zinc oxide (IZO).

A plurality of first common lines 140 and a plurality of second common lines 142, which contact the common electrode 130 and are formed in the same direction as a data line, are formed on the common electrode 130. Each of the first common lines 140 is formed to have a width of 5 μm or more. The second common line 142 is formed to have a broader width than that of the first common line 140. The first common lines 140 and the second common lines 142 may be formed in a planar structure having a circular shape, a tetragonal shape, or a diamond shape. In this case, a width of an upper end of the gap spacer 310 is formed greater than that of the first common line 140. Also, a width of an upper end of the push spacer 320 is formed greater than that of the second common line 142.

Each of the first common lines 140 and the second common lines 142 is formed to overlap a corresponding data line, and is formed of a conductive metal material having a low resistivity like copper, thereby lowering a resistance of the common electrode 130.

A passivation layer 150 is formed to cover the common electrode 130, the first common lines 140, and the second common lines 142. The passivation layer 150 is formed of an inorganic layer of $SiO_2$ or $SiN_x$. Also, the passivation layer 150 may be formed of an organic layer of an organic material in addition to an inorganic material.

A first alignment layer 160 is formed on the passivation layer 150. The first alignment layer 160 may be formed of polyimide (PI).

The passivation layer 150 and the first alignment layer 160 protrude along a profile of each of the first and second common lines 140 and 142, thereby forming a step height. A first projection pattern 172 is formed by the first common line 140, and is formed to have a height of 3,000 Å to 5,000 Å.

A second projection pattern 174 is formed by the second common line 142, and is formed to have a height of 3,000 Å to 5,000 Å. In this case, the first projection pattern 172 and the second projection pattern 174 may be formed to have the same height, or may be formed to have different heights.

A plurality of column spacers 310 and 320 are formed to overlap the first and second projection patterns 172 and 174 disposed on the first substrate 100.

The second substrate 200 includes a plurality of black matrixes 210, a plurality of red (R), green (G), and blue (B) color filters 220, an overcoat layer 230, the plurality of column spacers 310 and 320, and a second alignment layer 240. The black matrixes 210 are formed in correspondence with a shielding area, and the red (R), green (G), and blue (B) color filters 220 are formed in correspondence with an aperture area.

The black matrix 210 may be formed to overlap the TFT 110 formed on the first substrate (the TFT array substrate) 100, so as to minimize a reduction in an aperture area of a corresponding pixel.

The color filter 220 is formed by selectively coating and removing color pigments of red, green, and blue by using a mask, for displaying a color image.

The overcoat layer 230 is formed to cover the black matrix 210 and the color filter 220. The plurality of column spacers 310 and 320 are formed in an area, corresponding to the black matrix 210, on the overcoat layer 230.

The plurality of column spacers 310 and 320 include a gap spacer 310, which maintains a cell gap between the first substrate 100 and the second substrate 200, and a push spacer 320 that forms a push gap between the first substrate 100 and the second substrate 200. In FIG. 6, one of the plurality of gap spacers 310 and one of the plurality of push spacers 320 are illustrated.

The second alignment layer 240 is formed to cover the plurality of column spacers 310 and 320. The second alignment layer 240 may be formed of polyimide (PI).

The plurality of column spacers 310 and 320 may be formed in a planar structure having a circular shape, or may be formed in a planar structure having a bar shape. An upper end of the gap spacer 310 contacting the overcoat layer 230 may be formed to have a width of 16 μm, and a lower end of the gap spacer 310 corresponding to the projection pattern 170 may be formed to have a width of 12 μm. An upper end and a lower end of the push spacer 320 may be formed to have a broader width than that of the gap spacer 310. The gap spacer 310 and the push spacer 320 may be simultaneously formed by a single mask process using a half tone mask. The gap spacer 310 and the push spacer 320 are formed to overlap the TFT 110 of the first substrate 100 and the black matrix 210 of the second substrate 200.

The passivation layer 150 and the first alignment layer 160 protrude along the profile of the first common line 140 formed on the first substrate 100, and thus, the first projection pattern 172 is formed. The gap spacer 310 is formed in an area overlapping the first projection pattern 172, and maintains a cell gap between the first substrate 100 and the second substrate 200.

The passivation layer 150 and the first alignment layer 160 protrude along the profile of the second common line 142 formed on the first substrate 100, and thus, the second projection pattern 174 is formed. The gap spacer 310 is formed in an area overlapping the second projection pattern 172. The push spacer 320 is formed to have a lower height than that of the gap spacer 310, and thus, a push gap of 5,000 Å to 6,000 Å is formed between the first substrate 100 and the second substrate 200.

Although not shown, by changing a structure illustrated in FIG. 6, the gap spacer 310 and the push spacer 320 may be formed on the first substrate 100, and the first projection pattern 172 and the second projection pattern 174 may be formed on the second substrate 200.

In the LCD device according to the second embodiment of the present invention, the passivation layer 150 and the first alignment layer 160 are stacked on the first common line 140 which is formed so as to lower a resistance of the first common electrode 130 and the second common line 142, and thus, the first projection pattern 172 and the second projection pattern 174 are formed.

The gap spacer 310 is formed on the second substrate 200 to overlap the first projection pattern 172 having a narrow width, Therefore, the present invention prevents an alignment of the first alignment layer 160 and an alignment of the second alignment layer 240 from being changed in the aperture area, and prevents the first alignment layer 160 of the first substrate 100 from being damaged by a movement of the gap spacer 310, thereby preventing a light leakage.

In the LCD device according to the second embodiment of the present invention, since the second projection pattern 174 is formed at a portion in which the push spacer 320 is disposed, the push spacer 320 quickly contacts a surface overlapping the TFT 110 when a touch is applied, thereby preventing the gap spacer 310 from being collapsed.

Moreover, in the LCD device according to the second embodiment of the present invention, a smear is prevented from occurring in a portion touched by a finger, and a margin of a shielding area for reducing light leakage is improved, thereby increasing an aperture ratio.

Figure 7:
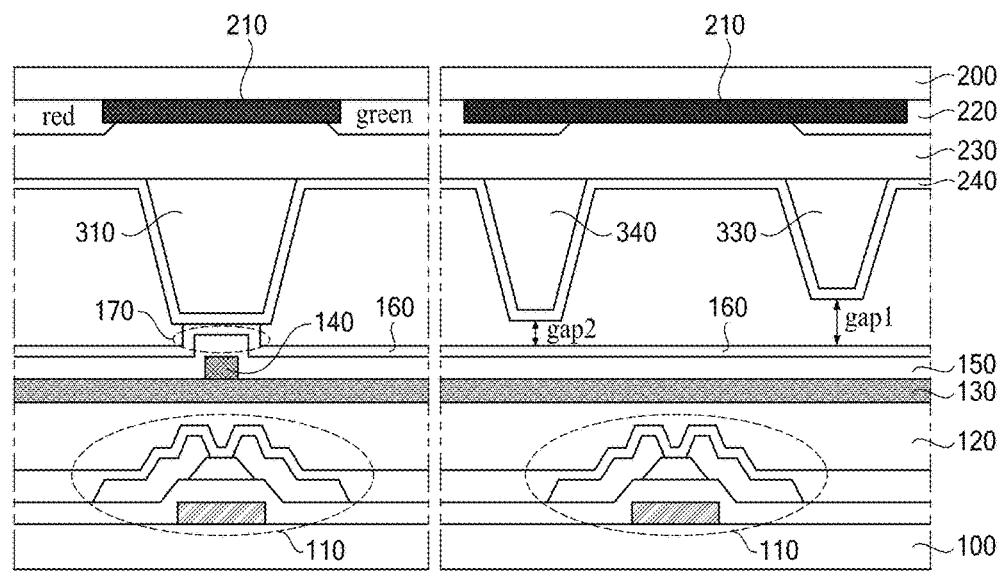
FIG. 7 is a cross-sectional view illustrating an LCD device according to a third embodiment of the present invention.

FIG. 7 is a cross-sectional view illustrating an LCD device according to a third embodiment of the present invention.

In describing the LCD device according to the third embodiment of the present invention, detailed descriptions on the same elements as the above-described first and second embodiments may not be provided.

Referring to FIG. 7, the LCD device according to the third embodiment of the present invention includes a first substrate (a thin film transistor (TFT) array substrate) 100, a second substrate (a color filter array substrate) 200, and a liquid crystal layer (not shown) formed between the first substrate 100 and the second substrate 200.

A planarizing layer 120 is formed to cover a TFT 110. The planarizing layer 120 is formed to a thickness 2.0 μm to 3.0 μm by coating photo acryl all over the first substrate 100. A step height of a surface caused by the TFT 110 is removed by planarizing the first substrate 100 with the planarizing layer 120.

A common electrode 130 for supplying a common voltage Vcom to the pixels is formed on the planarizing layer 120. The common electrode 130 is formed of a transparent conductive material such as indium tin oxide (ITO) or indium zinc oxide (IZO).

A plurality of first common lines 140, which contact the common electrode 130 and are formed in the same direction as a data line, are formed on the common electrode 130. The first common lines 140 are formed to have a width of 5 μm or more. The first common lines 140 may be formed in a planar structure having a circular shape, a tetragonal shape, or a diamond shape. In FIG. 7, one of the plurality of first common lines 140 is illustrated. Each of the first common lines 140 is formed to overlap a corresponding data line, and is formed of a conductive metal material having a low resistivity like copper, thereby lowering a resistance of the common electrode 130.

A passivation layer 150 is formed to cover the common electrode 130 and the first common lines 140. The passivation layer 150 is formed of an inorganic layer of $SiO_2$ or $SiN_x$. Also, the passivation layer 150 may be formed of an organic layer of an organic material in addition to an inorganic material.

Although not shown, a pixel electrode is formed on the passivation layer 150 in the aperture area, and is connected to the drain electrode of the TFT 110. A first alignment layer 160 is formed on the passivation layer 150. The first alignment layer 160 may be formed of polyimide (PI).

The passivation layer 150 and the first alignment layer 160 protrude along a profile of the first common line 140, thereby forming a step height. A projection pattern 170 is formed by the first common line 140, and is formed to have a height of 3,000 Å to 5,000 Å. A column spacer is formed on the second substrate 200 to contact the projection pattern 170 disposed on the first substrate 100. In this case, a width of an upper end of the gap spacer 310 is formed greater than that of the projection pattern 170.

The second substrate 200 includes a plurality of black matrixes 210, a plurality of red (R), green (G), and blue (B) color filters 220, an overcoat layer 230, a plurality of column spacers 310, 330 and 340, and a second alignment layer 240. The black matrixes 210 are formed in correspondence with a shielding area, and the red (R), green (G), and blue (B) color filters 220 are formed in correspondence with an aperture area.

The black matrix 210 may be formed to overlap the TFT 110 formed on the first substrate (the TFT array substrate) 100, so as to minimize a reduction in an aperture area of a corresponding pixel.

The color filter 220 is formed by selectively coating and removing color pigments of red, green, and blue by using a mask, for displaying a color image.

The overcoat layer 230 is formed to cover the black matrix 210 and the color filter 220. The plurality of column spacers 310, 330 and 340 are formed in an area, corresponding to the black matrix 210, on the overcoat layer 230.

The plurality of column spacers 310, 330 and 340 include a gap spacer 310 which maintains a cell gap between the first substrate 100 and the second substrate 200, a push spacer 330 that forms a push gap between the first substrate 100 and the second substrate 200, and an assistant gap spacer 340. In FIG. 7, one of a plurality of the gap spacers 310, one of a plurality of the push spacers 330, and one of a plurality of the assistant gap spacers 340 are illustrated.

The second alignment layer 240 is formed to cover the plurality of column spacers 310, 330 and 340. The second alignment layer 240 may be formed of polyimide (PI).

The plurality of column spacers 310, 330 and 340 may be formed in a planar structure having a circular shape, or may be formed in a planar structure having a bar shape. An upper end of the gap spacer 310 contacting the overcoat layer 230 may be formed to have a width of 16 μm, and a lower end of the gap spacer 310 corresponding to the projection pattern 170 may be formed to have a width of 12 μm.

An upper end and a lower end of the push spacer 330 may be formed to have a broader width than that of the gap spacer 310. Also, an upper end and a lower end of the assistant gap spacer 340 may be formed to have a broader width than that of the gap spacer 310.

The gap spacer 310, the push spacer 330, and the assistant gap spacer 340 may be simultaneously formed by a single mask process using a half tone mask.

The gap spacer 310, the push spacer 330, and the assistant gap spacer 340 are formed to overlap the TFT 110 of the first substrate 100 and the black matrix 210 of the second substrate 200. The passivation layer 150 and the first alignment layer 160 protrude along the profile of the first common line 140 formed on the first substrate 100, and thus, the projection pattern 170 is formed. The gap spacer 310 is formed in correspondence with the projection pattern 170, and maintains a cell gap between the first substrate 100 and the second substrate 200.

The push spacer 330 may be formed to have a lower height than that of the gap spacer 310. Also, the assistant gap spacer 340 may be formed to have the same height as that of the gap spacer 310.

Although not shown, by changing a structure illustrated in FIG. 7, the gap spacer 310, the push spacer 330, and the assistant gap spacer 340 may be formed on the first substrate 100, and the projection pattern 170 may be formed on the second substrate 200.

There is no step height in a portion, where the push spacer 330 and the assistant gap spacer 340 are formed, of the first substrate 100, and thus, a push gap is formed. A first push gap (gap 1) of 5,000 Å to 6,000 Å is formed between the first substrate 100 and the second substrate 200 by the push spacer 330. Also, a second push gap (gap 2) of 2,000 Å to 3,000 Å is formed by the assistant gap spacer 340. The assistant gap spacer 340 maintains a gap between the first substrate 100 and the second substrate 200, and forms the push gap.

When an external force is applied to the second substrate 200, the first and second push gaps prevent the liquid crystal panel from being damaged because the second substrate 200 is pushed. When the second substrate 200 is pushed by an external force, the assistant gap spacer 340 contacts a surface of the first substrate 100 before the push spacer 330 contacts the surface of the first substrate 100, thereby preventing the gap spacer 310 from being collapsed. Also, a push gap of 5,000 Å to 6,000 Å is secured between the first substrate 100 and the second substrate 200 by the push spacer 330, thereby ensuring push performance.

In the LCD device according to the third embodiment of the present invention, the passivation layer 150 and the first alignment layer 160 are stacked on the first common line 140 which is formed so as to lower a resistance of the first common electrode 130, and thus, the projection pattern 170 is formed.

The gap spacer 310 is formed on the second substrate 200 to overlap the projection pattern 170 having a narrow width. Therefore, the present invention prevents an alignment of the first alignment layer 160 and an alignment of the second alignment layer 240 from being changed in the aperture area, and prevents the first alignment layer 160 of the first substrate 100 from being damaged by a movement of the gap spacer 310, thereby preventing a light leakage.

Particularly, light is prevented from being leaked by an external force when a touch is applied, and the assistant gap spacer 340 contacts a surface overlapping the TFT 110 prior to the first push spacer 330, thereby preventing the gap spacer 310 from being collapsed. Also, a smear is prevented from occurring in a portion touched by a finger, and a margin of a shielding area for reducing light leakage is improved, thereby increasing an aperture ratio.

Figure 8:
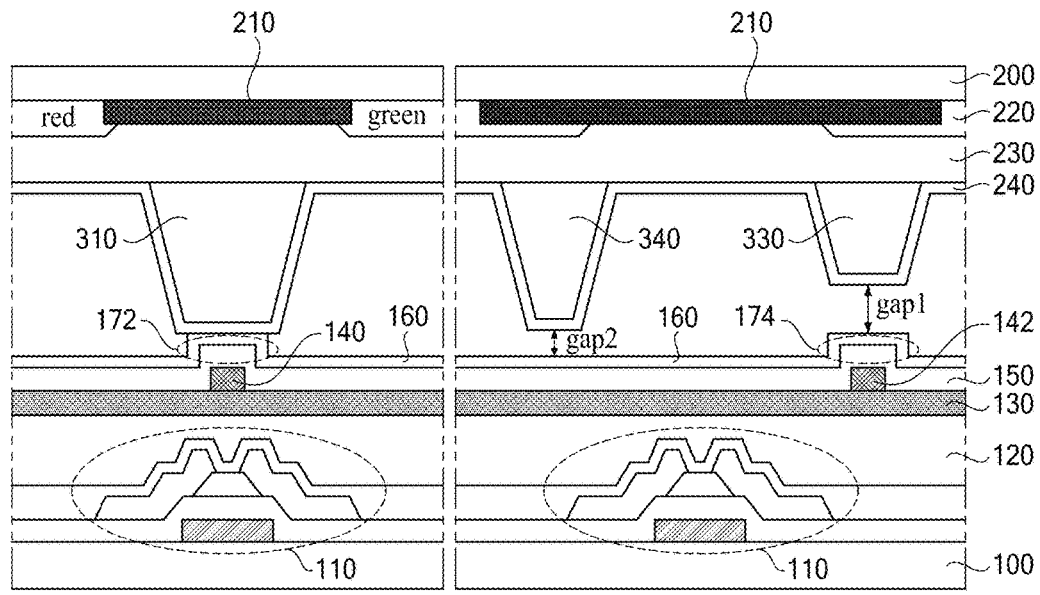
FIG. 8 is a cross-sectional view illustrating an LCD device according to a fourth embodiment of the present invention.

FIG. 8 is a cross-sectional view illustrating an LCD device according to a fourth embodiment of the present invention.

In describing the LCD device according to the fourth embodiment of the present invention, detailed descriptions on the same elements as the above-described first to third embodiments may not be provided.

Referring to FIG. 8, the LCD device according to the fourth embodiment of the present invention includes a first substrate (a thin film transistor (TFT) array substrate) 100, a second substrate (a color filter array substrate) 200, and a liquid crystal layer (not shown) formed between the first substrate 100 and the second substrate 200.

A planarizing layer 120 is formed to cover a TFT 110. The planarizing layer 120 is formed to a thickness 2.0 μm to 3.0 μm by coating photo acryl all over the first substrate 100. A step height of a surface caused by the TFT 110 is removed by planarizing the first substrate 100 with the planarizing layer 120.

A common electrode 130 for supplying a common voltage Vcom to the pixels is formed on the planarizing layer 120. The common electrode 130 is formed of a transparent conductive material such as indium tin oxide (ITO) or indium zinc oxide (IZO).

A plurality of first common lines 140 and a plurality of second common lines 142, which contact the common electrode 130 and are formed in the same direction as a data line, are formed on the common electrode 130. Each of the first common lines 140 is formed to have a width of 5 μm or more. The second common line 142 is formed to have a broader width than that of the first common line 140. The first common lines 140 and the second common lines 142 may be formed in a planar structure having a circular shape, a tetragonal shape, or a diamond shape.

Each of the first common lines 140 and the second common lines 142 is formed to overlap a corresponding data line, and is formed of a conductive metal material having a low resistivity like copper, thereby lowering a resistance of the common electrode 130.

A passivation layer 150 is formed to cover the common electrode 130, the first common lines 140, and the second common lines 142. The passivation layer 150 is formed of an inorganic layer of $SiO_2$ or $SiN_x$. Also, the passivation layer 150 may be formed of an organic layer of an organic material in addition to an inorganic material.

Although not shown, a pixel electrode is formed on the passivation layer 150 in the aperture area, and is connected to the drain electrode of the TFT 110. A first alignment layer 160 is formed on the passivation layer 150. The first alignment layer 160 may be formed of polyimide (PI).

The passivation layer 150 and the first alignment layer 160 protrude along a profile of each of the first and second common lines 140 and 142, thereby forming a step height. A first projection pattern 172 is formed by the first common line 140, and is formed to have a height of 3,000 Å to 5,000 Å. A second projection pattern 174 is formed by the second common line 142, and is formed to have a height of 3,000 Å to 5,000 Å. In this case, the first projection pattern 172 and the second projection pattern 174 may be formed to have the same height, or may be formed to have different heights.

A plurality of column spacers 310 and 320 are formed to overlap the first and second projection patterns 172 and 174 disposed on the first substrate 100.

The second substrate 200 includes a plurality of black matrixes 210, a plurality of red (R), green (G), and blue (B) color filters 220, an overcoat layer 230, the plurality of column spacers 310, 330 and 340, and a second alignment layer 240. The black matrixes 210 are formed in correspondence with a shielding area, and the red (R), green (G), and blue (B) color filters 220 are formed in correspondence with an aperture area.

The black matrix 210 may be formed to overlap the TFT 110 formed on the first substrate (the TFT array substrate) 100, so as to minimize a reduction in an aperture area of a corresponding pixel.

The color filter 220 is formed by selectively coating and removing color pigments of red, green, and blue by using a mask, for displaying a color image.

The overcoat layer 230 is formed to cover the black matrix 210 and the color filter 220. The plurality of column spacers 310, 330 and 340 are formed in an area, corresponding to the black matrix 210, on the overcoat layer 230.

The plurality of column spacers 310, 330 and 340 include a gap spacer 310 which maintains a cell gap between the first substrate 100 and the second substrate 200, a push spacer 330 that forms a push gap between the first substrate 100 and the second substrate 200, and an assistant gap spacer 340. In FIG. 8, one of a plurality of the gap spacers 310, one of a plurality of the push spacers 330, and one of a plurality of the assistant gap spacers 340 are illustrated.

A width of an upper end of the gap spacer 310 is formed greater than that of the first projection pattern 172. Also, a width of an upper end of the push spacer 330 is formed greater than that of the second projection pattern 174.

The second alignment layer 240 is formed to cover the plurality of column spacers 310, 330 and 340. The second alignment layer 240 may be formed of polyimide (PI).

The plurality of column spacers 310, 330 and 340 may be formed in a planar structure having a circular shape, or may be formed in a planar structure having a bar shape. An upper end of the gap spacer 310 contacting the overcoat layer 230 may be formed to have a width of 16 μm, and a lower end of the gap spacer 310 overlapping the projection pattern 170 may be formed to have a width of 12 μm.

An upper end and a lower end of the push spacer 330 may be formed to have a broader width than that of the gap spacer 310. Also, an upper end and a lower end of the assistant gap spacer 340 may be formed to have a broader width than that of the gap spacer 310.

The gap spacer 310, the push spacer 330, and the assistant gap spacer 340 may be simultaneously formed by a single mask process using a half tone mask.

The gap spacer 310, the push spacer 330, and the assistant gap spacer 340 are formed to overlap the TFT 110 of the first substrate 100 and the black matrix 210 of the second substrate 200. The passivation layer 150 and the first alignment layer 160 protrude along the profile of the first common line 140 formed on the first substrate 100, and thus, the projection pattern 170 is formed. The gap spacer 310 is formed in correspondence with the projection pattern 170, and maintains a cell gap between the first substrate 100 and the second substrate 200.

The push spacer 320 may be formed to have a lower height than that of the gap spacer 310. Also, the assistant gap spacer 340 may be formed to have the same height as that of the gap spacer 310.

The passivation layer 150 and the first alignment layer 160 protrude along the profile of the second common line 142 formed on the first substrate 100, and thus, the second projection pattern 174 is formed. The gap spacer 310 is formed in an area overlapping the second projection pattern 172. The push spacer 330 is formed to have a lower height than that of the gap spacer 310, and thus, a push gap of 5,000 Å to 6,000 Å is formed between the first substrate 100 and the second substrate 200.

Although not shown, by changing a structure illustrated in FIG. 8, the gap spacer 310, the push spacer 330, and the assistant gap spacer 340 may be formed on the first substrate 100, and the first and second projection patterns 172 and 174 may be formed on the second substrate 200.

A step height is formed at a portion, where the push spacer 330 is formed, of the first substrate 100 by the second projection pattern 174. There is no step height in a portion, where the assistant gap spacer 340 is formed, of the first substrate 100.

A first push gap (gap 1) of 5,000 Å to 6,000 Å is formed between the first substrate 100 and the second substrate 200 by the push spacer 330. Also, a second push gap (gap 2) of 2,000 Å to 3,000 Å is formed by the assistant gap spacer 340. When an external force is applied to the second substrate 200, the first and second push gaps prevent the liquid crystal panel from being damaged because the second substrate 200 is pushed.

When the second substrate 200 is pushed by an external force, the assistant gap spacer 340 contacts a surface of the first substrate 100 before the push spacer 330 contacts the surface of the first substrate 100, thereby preventing the gap spacer 310 from being collapsed. Also, a push gap of 5,000 Å to 6,000 Å is secured between the first substrate 100 and the second substrate 200 by the push spacer 330, thereby ensuring push performance.

In the LCD device according to the fourth embodiment of the present invention, the passivation layer 150 and the first alignment layer 160 are stacked on the first common line 140 which is formed so as to lower a resistance of the first common electrode 130, and thus, the first projection pattern 172 is formed.

The gap spacer 310 is formed on the second substrate 200 to overlap the first projection pattern 172 having a narrow width. Therefore, the present invention prevents an alignment of the first alignment layer 160 and an alignment of the second alignment layer 240 from being changed in the aperture area, and prevents the first alignment layer 160 of the first substrate 100 from being damaged by a movement of the gap spacer 310, thereby preventing a light leakage.

Particularly, light is prevented from being leaked by an external force when a touch is applied, and the assistant gap spacer 340 contacts a surface overlapping the TFT 110 prior to the first push spacer 330, thereby preventing the gap spacer 310 from being collapsed. Also, a smear is prevented from occurring in a portion touched by a finger, and a margin of a shielding area for reducing light leakage is improved, thereby increasing an aperture ratio.

Figure 9:
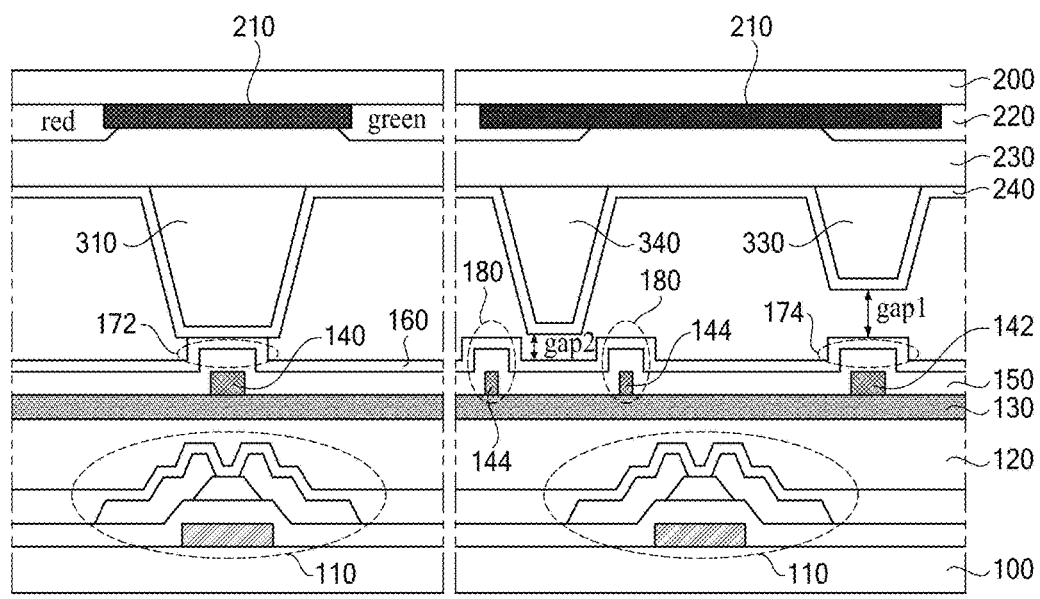
FIG. 9 is a cross-sectional view illustrating an LCD device according to a fifth embodiment of the present invention.

FIG. 9 is a cross-sectional view illustrating an LCD device according to a fifth embodiment of the present invention.

In describing the LCD device according to the fifth embodiment of the present invention, detailed descriptions on the same elements as the above-described first to fourth embodiments may not be provided.

Referring to FIG. 9, in the LCD device according to the fifth embodiment of the present invention, a guide pattern 180 for preventing an assistant gap spacer 340 from being moved is additionally formed on a first substrate 100.

A plurality of first common lines 140 and a plurality of second common lines 142, which contact a common electrode 130 and are formed in the same direction as a data line, are formed on the common electrode 130. Each of the first common lines 140 is formed to have a width of 5 μm or more. The second common line 142 is formed to have a broader width than that of the first common line 140. The first common lines 140 and the second common lines 142 may be formed in a planar structure having a circular shape, a tetragonal shape, or a diamond shape.

A third common line 144 is formed on the common electrode 130 to surround an area overlapping the assistant gap spacer 340. The third common line 144 is formed to have a narrower width than that of the first common line 140. The third common lines 144 may be formed in a planar structure having a circular shape, a tetragonal shape, or a diamond shape.

Each of the first common lines 140, the second common lines 142, and the third common line 144 is formed of a conductive metal material having a low resistivity like copper, thereby lowering a resistance of the common electrode 130.

A passivation layer 150 and an alignment layer 160 protrude along a profile of each of the first and second common lines 140 and 142, thereby forming a step height. A first projection pattern 172 is formed by the first common line 140, and is formed to have a height of 3,000 Å to 5,000 Å.

A second projection pattern 174 is formed by the second common line 142, and is formed to have a height of 3,000 Å to 5,000 Å. In this case, the first projection pattern 172 and the second projection pattern 174 may be formed to have the same height, or may be formed to have different heights.

Moreover, the passivation layer 150 and the alignment layer 160 protrude along a profile of each of the third common line 144, thereby forming a step height. The guide pattern 180 is formed by the third common line 144, and prevents the assistant gap spacer 340 from being moved when an external force is applied to a second substrate 200.

Although not shown, by changing a structure illustrated in FIG. 9, a gap spacer 310, a push spacer 330, and the assistant gap spacer 340 may be formed on the first substrate 100, and the first projection pattern 172, the second projection pattern 174, and the guide pattern 180 may be formed on the second substrate 200.

In the LCD device according to the fifth embodiment of the present invention, the assistant gap spacer 340 is prevented from being moved by the guide pattern 180, and thus, an alignment direction of an alignment layer is prevented from being changed, and the alignment is prevented from being damaged due to a movement of a column spacer. Also, a margin of a shielding area for reducing light leakage is improved, thereby the shielding area is reduced and increasing an aperture ratio.

Figure 10:
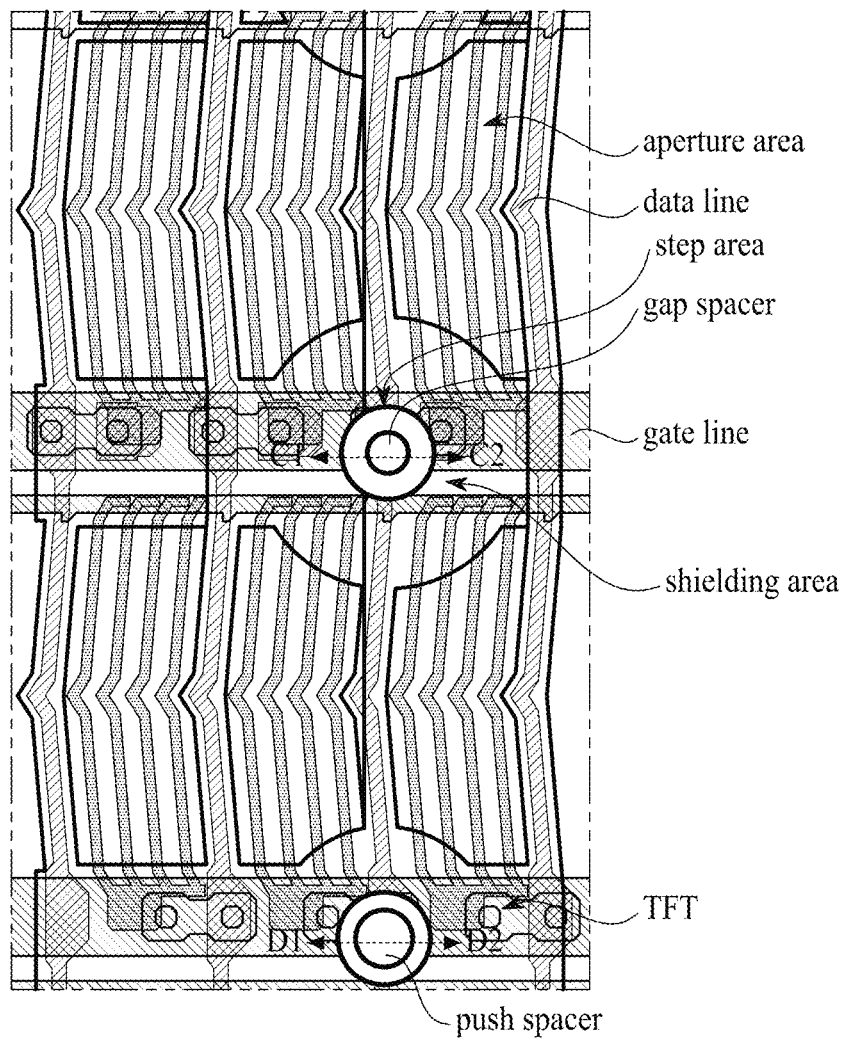
FIG. 10 is a cross-sectional view illustrating an LCD device according to a sixth embodiment of the present invention.
Figure 11:
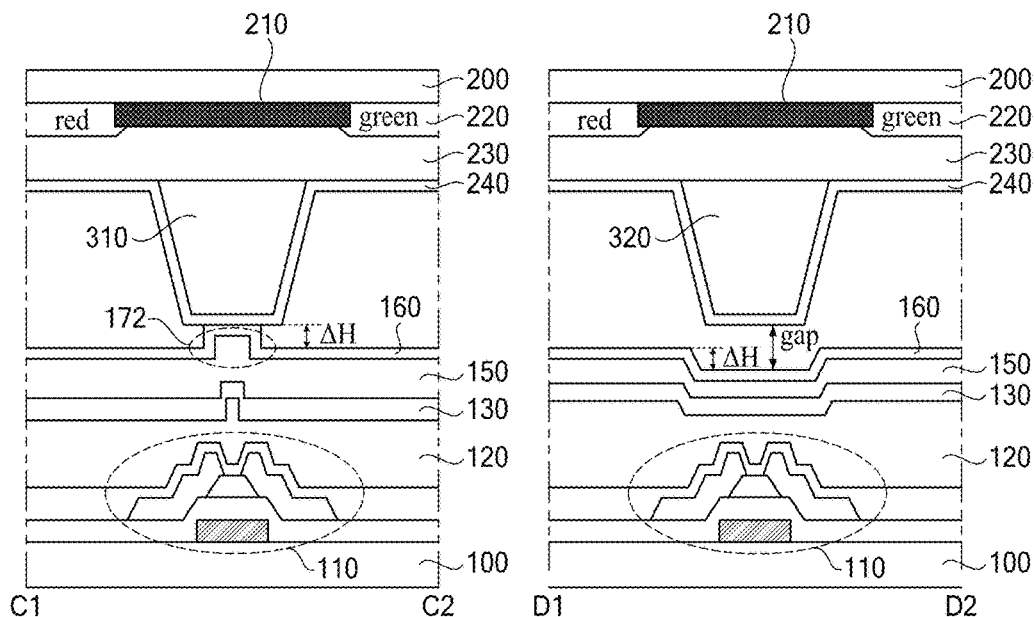
FIG. 11 is a cross-sectional view taken along line C1-C2 of FIG. 10 and a cross-sectional view taken along line D1-D2 of FIG. 10.

FIG. 10 is a cross-sectional view illustrating an LCD device according to a sixth embodiment of the present invention, and FIG. 11 is a cross-sectional view taken along line C1-C2 of FIG. 10 and a cross-sectional view taken along line D1-D2 of FIG. 10.

In FIG. 10, some of a plurality of pixels of the LCD device according to the sixth embodiment of the present invention are illustrated, and one of a plurality of gap spacers and one of a plurality of push spacers are illustrated.

In describing the LCD device according to the sixth embodiment of the present invention, detailed descriptions on the same elements as the above-described first to fifth embodiments may not be provided.

Referring to FIGS. 10 and 11, the LCD device according to the sixth embodiment of the present invention includes a first substrate (a thin film transistor (TFT) array substrate) 100, a second substrate (a color filter array substrate) 200, and a liquid crystal layer (not shown) formed between the first substrate 100 and the second substrate 200.

The first substrate 100 is the TFT array substrate. An aperture area which displays an image by transmitting light and a shielding area through which the light cannot pass are formed on the first substrate 100.

A planarizing layer 120 is formed to cover the TFT 110 of the first substrate 100. The planarizing layer 120 is formed to a thickness 2.0 μm to 3.0 μm by coating photo acryl all over the first substrate 100.

A common electrode 130 for supplying a common voltage Vcom to the pixels is formed on the planarizing layer 120. The common electrode 130 is formed of a transparent conductive material such as indium tin oxide (ITO) or indium zinc oxide (IZO). The common electrode 130 may be formed all over the first substrate 100.

A passivation layer 150 is formed to cover the common electrode 130. The passivation layer 150 is formed of an inorganic layer of $SiO_2$ or $SiN_x$. Also, the passivation layer 150 may be formed of an organic layer of an organic material in addition to an inorganic material. A first alignment layer 160 is formed on the passivation layer 150. The first alignment layer 160 may be formed of polyimide (PI).

Here, a projection 172 is formed in a partial area of the planarizing layer 120 by adjusting a thickness of the planarizing layer 120 with a half tone mask in a manufacturing process. For example, a thickness of the planarizing layer 120 in an area corresponding to the gap spacer 310 of the second substrate 200 is maintained as-is, and the projection 172 is formed. Also, a step height is formed around the projection 172 by decreasing the thickness of the planarizing layer 120 in a peripheral area corresponding to the gap spacer 310. A common electrode 130, a passivation layer 150, and a first alignment layer 160 are stacked along a profile of the planarizing layer 120 where the step height is formed, thereby forming the projection 172.

The projection 172 formed by the step height of the planarizing layer 120 is formed to have a height of 3,000 Å to 5,000 Å by stacking an organic layer and an inorganic layer. A column spacer is formed on the second substrate 200 to contact the projection 172 disposed on the first substrate 100.

A groove pattern is formed in a partial area of the planarizing layer 120 by adjusting a thickness of the planarizing layer 120 with the half tone mask in the manufacturing process. For example, the groove pattern is formed by decreasing the thickness of the planarizing layer 120 in an area corresponding to the push spacer 310 of the second substrate 200, and a push gap equal to A H is additionally secured by a step height of the groove pattern.

The second substrate 200 includes a plurality of black matrixes 210, a plurality of red (R), green (G), and blue (B) color filters 220, an overcoat layer 230, a plurality of column spacers 310 and 320, and a second alignment layer 240. The black matrixes 210 are formed in correspondence with a shielding area, and the red (R), green (G), and blue (B) color filters 220 are formed in correspondence with an aperture area.

The black matrix 210 may be formed to overlap the TFT 110 formed on the first substrate (the TFT array substrate) 100, so as to minimize a reduction in an aperture area of a corresponding pixel.

The overcoat layer 230 is formed to cover the black matrix 210 and the color filter 220. The plurality of column spacers 310 and 320 are formed in an area, corresponding to the black matrix 210, on the overcoat layer 230.

The plurality of column spacers 310 and 320 include a gap spacer 310, which maintains a cell gap between the first substrate 100 and the second substrate 200, and a push spacer 320 that forms a push gap between the first substrate 100 and the second substrate 200. In FIG. 11, one of the plurality of gap spacers 310 and one of the plurality of push spacers 320 are illustrated.

The second alignment layer 240 is formed to cover the plurality of column spacers 310 and 320. The second alignment layer 240 may be formed of polyimide (PI).

The plurality of column spacers 310 and 320 may be formed in a planar structure having a circular shape, or may be formed in a planar structure having a bar shape. An upper end of the gap spacer 310 contacting the overcoat layer 230 may be formed to have a width of 16 μm, and a lower end of the gap spacer 310 overlapping the projection 172 may be formed to have a width of 12 μm. An upper end and a lower end of the push spacer 320 may be formed to have a broader width than that of the gap spacer 310. The gap spacer 310 and the push spacer 320 may be simultaneously formed by a single mask process using a half tone mask.

The gap spacer 310 and the push spacer 320 are formed to overlap the TFT 110 of the first substrate 100 and the black matrix 210 of the second substrate 200. The gap spacer 310 is formed to contact the projection 172 formed on the first substrate 100, and maintains a cell gap between the first substrate 100 and the second substrate 200.

The push spacer 320 may be formed to have the same height as that of the gap spacer 310, or may be formed to have a lower height than that of the gap spacer 310. A groove pattern is formed at a portion, where the push spacer 320 is formed, by reducing a thickness of the planarizing layer 120, and thus, a push gap of 5,000 Å to 6,000 Å is formed between the first substrate 100 and the second substrate 200. Therefore, the push gap is sufficiently secured, and thus, when an external force is applied to the second substrate 200, the push gap prevents the liquid crystal panel from being damaged because the second substrate 200 is pushed.

Although not shown, by changing a structure illustrated in FIG. 11, the gap spacer 310 and the push spacer 320 may be formed on the first substrate 100, and the projection 170 and a groove may be formed on the second substrate 200. In this case, the projection 172 and the groove may be formed by adjusting a thickness of the overcoat layer 230.

In the LCD device according to the sixth embodiment of the present invention, the projection 172 is formed in an area overlapping the gap spacer 310 by adjusting a thickness of the planarizing layer 120, and a groove pattern is formed in an area overlapping the push spacer 320.

The present invention prevents an alignment of the first alignment layer 160 and an alignment of the second alignment layer 240 from being changed in the aperture area Moreover, the present invention prevents the first alignment layer 160 of the first substrate 100 from being damaged by a movement of the gap spacer 310, thereby removing a light leakage. Also, the push gap is sufficiently secured in an area where the push spacer 320 is formed, and thus, push performance can be enhanced.

Figure 12:
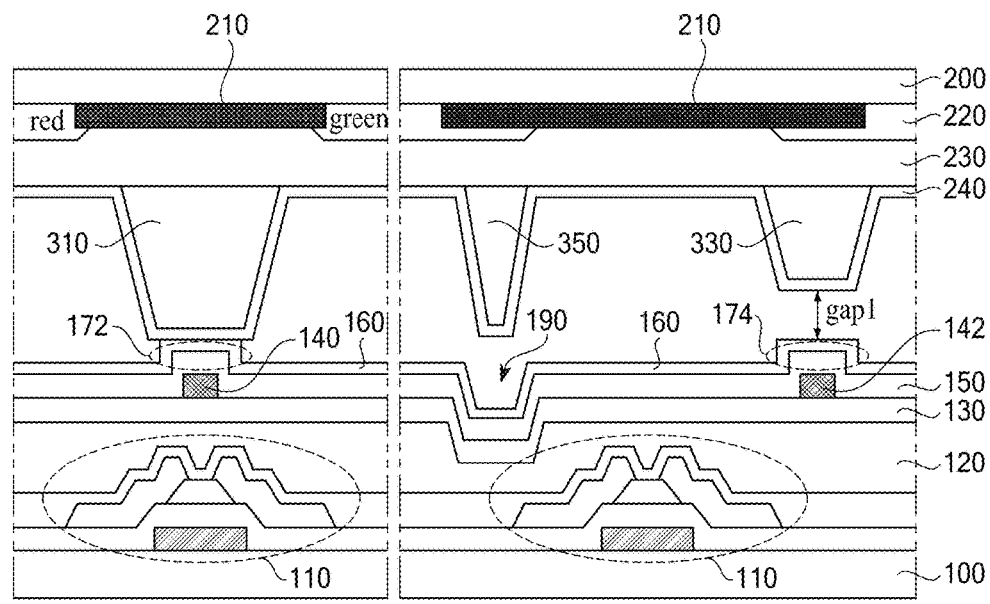
FIG. 12 is a cross-sectional view illustrating an LCD device according to a seventh embodiment of the present invention.

FIG. 12 is a cross-sectional view illustrating an LCD device according to a seventh embodiment of the present invention.

In describing the LCD device according to the seventh embodiment of the present invention, detailed descriptions on the same elements as the above-described first to sixth embodiments may not be provided.

Referring to FIG. 12, the LCD device according to the seventh embodiment of the present invention includes a first substrate (a thin film transistor (TFT) array substrate) 100, a second substrate (a color filter array substrate) 200, and a liquid crystal layer (not shown) formed between the first substrate 100 and the second substrate 200.

A planarizing layer 120 is formed to cover the TFT 110. The planarizing layer 120 is formed to a thickness 2.0 μm to 3.0 μm by coating photo acryl all over the first substrate 100.

A common electrode 130 for supplying a common voltage Vcom to the pixels is formed on the planarizing layer 120. The common electrode 130 is formed of a transparent conductive material such as indium tin oxide (ITO) or indium zinc oxide (IZO).

A plurality of first common lines 140 and a plurality of second common lines 142, which contact the common electrode 130 and are formed in the same direction as a data line, are formed on the common electrode 130. Each of the first common lines 140 is formed to have a width of 5 μm or more. The second common line 142 is formed to have a broader width than that of the first common line 140. The first common lines 140 and the second common lines 142 may be formed in a planar structure having a circular shape, a tetragonal shape, or a diamond shape.

Each of the first common lines 140 and the second common lines 142 is formed to overlap a corresponding data line, and is formed of a conductive metal material having a low resistivity like copper, thereby lowering a resistance of the common electrode 130.

A passivation layer 150 is formed to cover the common electrode 130, the first common lines 140, and the second common lines 142. The passivation layer 150 is formed of an inorganic layer of $SiO_2$ or $SiN_x$. Also, the passivation layer 150 may be formed of an organic layer of an organic material in addition to an inorganic material.

A first alignment layer 160 is formed on the passivation layer 150. The first alignment layer 160 may be formed of polyimide (PI).

The passivation layer 150 and the first alignment layer 160 protrude along a profile of each of the first and second common lines 140 and 142, thereby forming a step height. A first projection pattern 172 is formed by the first common line 140, and is formed to have a height of 3,000 Å to 5,000 Å. A second projection pattern 174 is formed by the second common line 142, and is formed to have a height of 3,000 Å to 5,000 Å. In this case, the first projection pattern 172 and the second projection pattern 174 may be formed to have the same height, or may be formed to have different heights.

A groove pattern is formed in a partial area of the planarizing layer 120 by adjusting a thickness of the planarizing layer 120 with the half tone mask in the manufacturing process. For example, the groove pattern is formed by decreasing the thickness of the planarizing layer 120 in an area corresponding to the push spacer 310 of the second substrate 200.

The second substrate 200 includes a plurality of black matrixes 210, a plurality of red (R), green (G), and blue (B) color filters 220, an overcoat layer 230, the plurality of column spacers 310, 330 and 350, and a second alignment layer 240. The black matrixes 210 are formed in correspondence with a shielding area, and the red (R), green (G), and blue (B) color filters 220 are formed in correspondence with an aperture area.

The black matrix 210 may be formed to overlap the TFT 110 formed on the first substrate (the TFT array substrate) 100, so as to minimize a reduction in an aperture area of a corresponding pixel.

The overcoat layer 230 is formed to cover the black matrix 210 and the color filter 220. The plurality of column spacers 310, 330 and 350 are formed in an area, corresponding to the black matrix 210, on the overcoat layer 230.

The plurality of column spacers 310, 330 and 350 include a gap spacer 310 which maintains a cell gap between the first substrate 100 and the second substrate 200, a push spacer 330 that forms a push gap between the first substrate 100 and the second substrate 200, and an assistant gap spacer 350 that prevents movement caused by an external force. In FIG. 12, one of a plurality of the gap spacers 310, one of a plurality of the push spacers 330, and one of a plurality of the assistant gap spacers 350 are illustrated.

The second alignment layer 240 is formed to cover the plurality of column spacers 310, 330 and 350. The second alignment layer 240 may be formed of polyimide (PI).

The plurality of column spacers 310, 330 and 350 may be formed in a planar structure having a circular shape, or may be formed in a planar structure having a bar shape. An upper end of the gap spacer 310 contacting the overcoat layer 230 may be formed to have a width of 16 µm, and a lower end of the gap spacer 310 contacting the projection pattern 170 may be formed to have a width of 12 µm.

For example, the gap spacer 310 may be formed in a planar structure having a circular shape, the push spacer 330 may be formed in a planar structure having a circular shape, and the assistant gap spacer 350 may be formed in a planar structure having a tetragonal shape.

An upper end and a lower end of the push spacer 330 may be formed to have a broader width than that of the gap spacer 310. Also, an upper end and a lower end of the assistant gap spacer 340 may be formed to have a broader width than that of the gap spacer 310. However, the present embodiment is not limited thereto. An upper end and a lower end of the assistant gap spacer 350 may be formed to have a narrower width than that of the gap spacer 310.

The gap spacer 310, the push spacer 330, and the assistant gap spacer 350 may be simultaneously formed by a single mask process using a half tone mask.

The gap spacer 310, the push spacer 330, and the assistant gap spacer 350 are formed to overlap the TFT 110 of the first substrate 100 and the black matrix 210 of the second substrate 200. The passivation layer 150 and the first alignment layer 160 protrude along the profile of the first common line 140 formed on the first substrate 100, and thus, the projection pattern 170 is formed. The gap spacer 310 is formed in correspondence with the projection pattern 170, and maintains a cell gap between the first substrate 100 and the second substrate 200.

The passivation layer 150 and the first alignment layer 160 protrude along the profile of the second common line 142 formed on the first substrate 100, and thus, the second projection pattern 174 is formed. The push spacer 330 is formed in an area overlapping the second projection pattern 172. The push spacer 330 is formed to have a lower height than that of the gap spacer 310, and thus, a push gap of 5,000 Å to 6,000 Å is formed between the first substrate 100 and the second substrate 200.

The assistant gap spacer 350 may be formed to have the same height as that of the gap spacer 310, or may be formed higher than the gap spacer 310. A groove pattern 190, which is formed on the first substrate 100 (a lower substrate) in correspondence with the assistant gap spacer 350, prevents the column spacer from being moved by an external force. When the assistant gap spacer 350 is downward pushed by an external force, the assistant gap spacer 350 is inserted into the groove pattern 190. The assistant gap spacer 350 is inserted into the groove pattern 190, and is restricted by the inside of the groove pattern 190. Therefore, the column spacer is prevented from being moved by an external force.

Although not shown, by changing a structure illustrated in FIG. 12, the gap spacer 310, the push spacer 330, and the assistant gap spacer 350 may be formed on the first substrate 100, and the first projection pattern 172, the second projection pattern 174, and the groove pattern 190 may be formed on the second substrate 200. In this case, the first projection pattern 172, the second projection pattern 174, and the groove pattern 190 may be formed by adjusting a thickness of the overcoat layer 230.

In the LCD device according to the seventh embodiment of the present invention, a push gap of 5,000 Å to 6,000 Å is formed between the first substrate 100 and the second substrate 200 by the push spacer 330. When an external force is applied to the second substrate 200, the push gap prevents the liquid crystal panel from being damaged because the second substrate 200 is pushed.

Moreover, the assistant gap spacer 350 is inserted into the groove pattern 190 formed on the lower substrate 100, and is restricted by the inside of the groove pattern 190. Therefore, a spacer is prevented from being moved by an external force.

Moreover, when an external large force is applied to the liquid crystal panel, the assistant gap spacer 350 restricted by the groove pattern 190 is pushed out to the outside of the groove pattern 190. In this case, the assistant gap spacer 350 contacts a surface of the first substrate 100, and thus, a frictional force increases, whereby a movement of the column spacer is restricted. That is, when an external large force is applied to the liquid crystal panel, the assistant gap spacer 350 in addition to the gap spacer 310 contacts the surface of the first substrate 100, and thus, an area in which the spacer contacts the surface of the first substrate 100 increases. A frictional force between the column spacers and the surface of the first substrate 100 increases, and thus, a movement of the spacer is restricted.

The LCD device according to the seventh embodiment of the present invention prevents an alignment of the first alignment layer 160 and an alignment of the second alignment layer 240 from being changed in the aperture area, and prevents the first alignment layer 160 of the first substrate 100 from being damaged by a movement of the spacer, thereby preventing a light leakage. Light is prevented from being leaked by an external force when a touch is applied, and a margin of a shielding area for reducing light leakage is improved, thereby increasing an aperture ratio.

Figure 13:
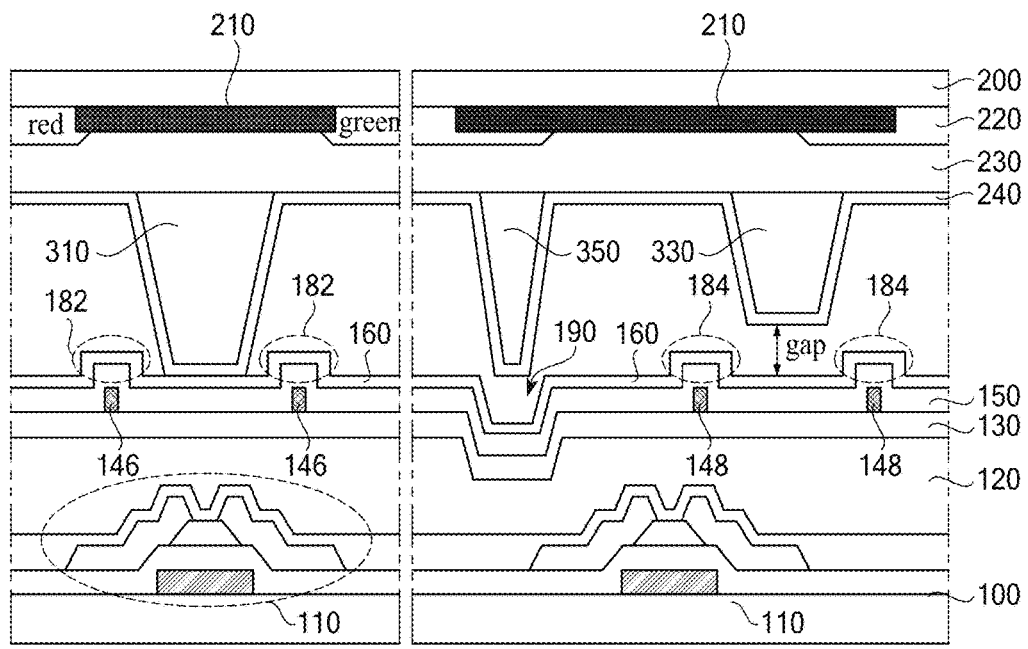
FIG. 13 is a cross-sectional view illustrating an LCD device according to an eighth embodiment of the present invention.

FIG. 13 is a cross-sectional view illustrating an LCD device according to an eighth embodiment of the present invention.

In describing the LCD device according to the eighth embodiment of the present invention, detailed descriptions on the same elements as the above-described first to seventh embodiments may not be provided.

Referring to FIG. 13, the LCD device according to the eighth embodiment of the present invention includes a first substrate (a thin film transistor (TFT) array substrate) 100, a second substrate (a color filter array substrate) 200, and a liquid crystal layer (not shown) formed between the first substrate 100 and the second substrate 200.

A planarizing layer 120 is formed to cover the TFT 110. The planarizing layer 120 is formed to a thickness 2.0 µm to 3.0 µm by coating photo acryl all over the first substrate 100.

A common electrode 130 for supplying a common voltage Vcom to the pixels is formed on the planarizing layer 120.

The common electrode 130 is formed of a transparent conductive material such as indium tin oxide (ITO) or indium zinc oxide (IZO).

A plurality of first common lines 146 and a plurality of second common lines 148, which contact the common electrode 130 and are formed in the same direction as a data line, are formed on the common electrode 130. Each of the first common lines 146 is formed to have a width of 5 μm or more. The second common line 148 is formed to have the same width as that of the first common line 146, or is formed to have a broader width than that of the first common line 146. The first common lines 146 and the second common lines 148 may be formed in a planar structure having a circular shape, a tetragonal shape, or a diamond shape.

The first common lines 146 are formed on the first substrate 100 to surround the gap spacer 310 of the second substrate 200. The second common lines 148 are formed on the first substrate 100 to surround the push spacer 330 of the second substrate 200. Each of the first common lines 146 and the second common lines 148 is formed of a conductive metal material having a low resistivity like copper, thereby lowering a resistance of the common electrode 130.

A passivation layer 150 is formed to cover the common electrode 130, the first common lines 146, and the second common lines 148. The passivation layer 150 is formed of an inorganic layer of $SiO_2$ or $SiN_x$. Also, the passivation layer 150 may be formed of an organic layer of an organic material in addition to an inorganic material.

Although not shown, a pixel electrode is formed on the passivation layer 150 in the aperture area, and is connected to the drain electrode of the TFT 110. A first alignment layer 160 is formed on the passivation layer 150. The first alignment layer 160 may be formed of polyimide (PI).

The passivation layer 150 and the first alignment layer 160 protrude along a profile of each of the first and second common lines 146 and 148, thereby forming a step height. A first guide pattern 182 is formed by the first common line 146, and is formed to have a height of 3,000 Å to 5,000 Å. A second guide pattern 184 is formed by the second common line 148, and is formed to have a height of 3,000 Å to 5,000 Å. In this case, the first guide pattern 182 and the second guide pattern 184 may be formed to have the same height, or may be formed to have different heights.

When the second substrate 200 is pushed by an external force, the first guide pattern 182 restricts a movement of the gap spacer 310. Also, when the second substrate 200 is pushed by an external force, the second guide pattern 184 restricts a movement of the push spacer 330.

A groove pattern is formed in a partial area of the planarizing layer 120 by adjusting a thickness of the planarizing layer 120 with the half tone mask in the manufacturing process. For example, the groove pattern is formed by decreasing the thickness of the planarizing layer 120 in an area corresponding to the push spacer 310 of the second substrate 200.

The second substrate 200 includes a plurality of black matrixes 210, a plurality of red (R), green (G), and blue (B) color filters 220, an overcoat layer 230, a plurality of column spacers 310 and 320, and a second alignment layer 240. The black matrixes 210 are formed in correspondence with a shielding area, and the red (R), green (G), and blue (B) color filters 220 are formed in correspondence with an aperture area.

The black matrix 210 may be formed to overlap the TFT 110 formed on the first substrate (the TFT array substrate) 100, so as to minimize a reduction in an aperture area of a corresponding pixel.

The color filter 220 is formed by selectively coating and removing color pigments of red, green, and blue by using a mask, for displaying a color image.

The second substrate 200 includes a plurality of black matrixes 210, a plurality of red (R), green (G), and blue (B) color filters 220, an overcoat layer 230, the plurality of column spacers 310, 330 and 350, and a second alignment layer 240. The black matrixes 210 are formed in correspondence with a shielding area, and the red (R), green (G), and blue (B) color filters 220 are formed in correspondence with an aperture area.

The black matrix 210 may be formed to overlap the TFT 110 formed on the first substrate (the TFT array substrate) 100, so as to minimize a reduction in an aperture area of a corresponding pixel.

The color filter 220 is formed by selectively coating and removing color pigments of red, green, and blue by using a mask, for displaying a color image.

The overcoat layer 230 is formed to cover the black matrix 210 and the color filter 220. The plurality of column spacers 310, 330 and 350 are formed in an area, corresponding to the black matrix 210, on the overcoat layer 230.

The plurality of column spacers 310, 330 and 350 include a gap spacer 310 which maintains a cell gap between the first substrate 100 and the second substrate 200, a push spacer 330 that forms a push gap between the first substrate 100 and the second substrate 200, and an assistant gap spacer 350 that prevents movement caused by an external force. In FIG. 13, one of a plurality of the gap spacers 310, one of a plurality of the push spacers 330, and one of a plurality of the assistant gap spacers 350 are illustrated.

The second alignment layer 240 is formed to cover the plurality of column spacers 310, 330 and 350. The second alignment layer 240 may be formed of polyimide (PI).

The plurality of column spacers 310, 330 and 340 may be formed in a planar structure having a circular shape, or may be formed in a planar structure having a bar shape. An upper end of the gap spacer 310 contacting the overcoat layer 230 may be formed to have a width of 16 μm, and a lower end of the gap spacer 310 contacting the projection pattern 170 may be formed to have a width of 12 μm.

For example, the gap spacer 310 may be formed in a planar structure having a circular shape, the push spacer 330 may be formed in a planar structure having a circular shape, and the assistant gap spacer 350 may be formed in a planar structure having a tetragonal shape.

An upper end and a lower end of the push spacer 330 may be formed to have a broader width than that of the gap spacer 310. Also, an upper end and a lower end of the assistant gap spacer 340 may be formed to have a broader width than that of the gap spacer 310. However, the present embodiment is not limited thereto. An upper end and a lower end of the assistant gap spacer 350 may be formed to have a narrower width than that of the gap spacer 310.

The gap spacer 310, the push spacer 330, and the assistant gap spacer 350 may be simultaneously formed by a single mask process using a half tone mask.

The gap spacer 310, the push spacer 330, and the assistant gap spacer 350 are formed to overlap the TFT 110 of the first substrate 100 and the black matrix 210 of the second substrate 200.

The gap spacer 310 is formed to contact a surface of the first substrate 100, and maintains a cell gap between the first substrate 100 and the second substrate 200. Also, the push spacer 330 is formed to have a certain gap with the surface of the first substrate 100, and forms a push gap between the first substrate 100 and the second substrate 200. The push spacer 330 is formed to have a lower height than that of the gap spacer 310, and thus, a push gap of 5,000 Å to 6,000 Å is formed between the first substrate 100 and the second substrate 200.

The passivation layer 150 and the first alignment layer 160 protrude along a profile of the first common line 146, and thus, a first guide pattern 182 is formed. When the second substrate 200 is pushed, the first guide pattern 182 restricts a movement of the gap spacer 310.

The passivation layer 150 and the first alignment layer 160 protrude along a profile of the second common line 148 formed on the first substrate 100, and thus, a second guide line 184 is formed. When the second substrate 200 is pushed, the second guide line 184 restricts a movement of the push spacer 330.

The assistant gap spacer 350 may be formed to have the same height as that of the gap spacer 310, or may be formed higher than the gap spacer 310. A groove pattern 190, which is formed on the first substrate 100 (a lower substrate) in correspondence with the assistant gap spacer 350, prevents the column spacer from being moved by an external force. When the assistant gap spacer 350 is downward pushed by an external force, the assistant gap spacer 350 is inserted into the groove pattern 190. The assistant gap spacer 350 is inserted into the groove pattern 190, and is restricted by the inside of the groove pattern 190. Therefore, the column spacer is prevented from being moved by an external force.

Although not shown, by changing a structure illustrated in FIG. 13, the gap spacer 310, the push spacer 330, and the assistant gap spacer 350 may be formed on the first substrate 100, and the first guide pattern 182, the second guide line 184, and the groove pattern 190 may be formed on the second substrate 200. In this case, the first guide pattern 182, the second guide line 184, and the groove pattern 190 may be formed by adjusting a thickness of the overcoat layer 230.

In the LCD device according to the eighth embodiment of the present invention, a push gap of 5,000 Å to 6,000 Å is formed between the first substrate 100 and the second substrate 200 by the push spacer 330. When an external force is applied to the second substrate 200, the push gap prevents the liquid crystal panel from being damaged because the second substrate 200 is pushed.

When an external force is applied to the second substrate 200, the assistant gap spacer 350 is inserted into the groove pattern 190 formed on the lower substrate 100, and is restricted by the inside of the groove pattern 190. Therefore, a spacer is prevented from being moved by an external force.

Moreover, when an external large force is applied to the liquid crystal panel, the assistant gap spacer 350 restricted by the groove pattern 190 is pushed out to the outside of the groove pattern 190. In this case, the assistant gap spacer 350 contacts a surface of the first substrate 100, and thus, a frictional force increases, whereby a movement of the column spacer is restricted. That is, when an external large force is applied to the liquid crystal panel, the assistant gap spacer 350 in addition to the gap spacer 310 contacts the surface of the first substrate 100, and thus, a density in which the spacer contacts the surface of the first substrate 100 increases. A frictional force between the spacers and the surface of the first substrate 100 increases, and thus, a movement of the spacer is restricted.

Moreover, a movement of the gap spacer 310 is restricted by the first guide pattern 182, and a movement of the push spacer 330 is restricted by the second guide line 184, thereby preventing an alignment of the first and second alignment layers 160 and 240 from being changed in the aperture area.

Moreover, the present invention prevents the first alignment layer 160 of the first substrate 100 from being damaged by a movement of the spacer, thereby preventing a light leakage. Light is prevented from being leaked by an external force when a touch is applied, and a margin of a shielding area for reducing light leakage is improved, thereby increasing an aperture ratio.

In the present invention described above with reference to the drawings, an LCD device having an in-plane switching (IPS) mode or a fringe field switching (FFS) mode where a pixel electrode and a common electrode are formed on a TFT array substrate has been described above as an example. However, the present invention is not limited thereto. The above-described column spacer structure according to the present invention may be applied to a twisted nematic (TN) mode or a vertical alignment (VA) mode where the pixel electrode is formed on the TFT array substrate and the common electrode is formed on a color filter array substrate.

The LCD device according to the embodiments of the present invention prevents an alignment of the first alignment layer of the first substrate and an alignment of the second alignment layer of the second substrate from being changed in the aperture area, and prevents the first alignment layer from being damaged by a movement of the gap spacer, thereby preventing a light leakage.

In the LCD device according to the embodiments of the present invention, light is prevented from being leaked by an external force when a touch is applied, and the push spacer quickly contacts a surface overlapping a TFT, thereby preventing the gap spacer from being collapsed.

In the LCD device according to the embodiments of the present invention, a smear is prevented from occurring in a portion touched by a finger, and a margin of a shielding area for reducing light leakage is improved, thereby increasing an aperture ratio.

In the LCD device according to the embodiments of the present invention, since the second projection pattern is formed at a portion in which the push spacer is disposed, the push spacer quickly contacts a surface overlapping a TFT when a touch is applied, thereby preventing the gap spacer from being collapsed.

In the LCD device according to the embodiments of the present invention, when an external force is applied to the second substrate, the assistant gap spacer is inserted into the groove pattern disposed on the lower substrate, and is restricted by the inside of the groove pattern, thereby preventing a spacer from being moved by the external force.

In the LCD device according to the embodiments of the present invention, when an external large force is applied to the liquid crystal panel, the assistant gap spacer contacts a surface of the first substrate, and thus, a frictional force increases, whereby a movement of a spacer is restricted.

In an aspect of the present invention, there is provided an apparatus including: a color filter (CF) substrate having a black matrix layer; a thin-film transistor (TFT) substrate having an alignment layer; and a structure, between said CF substrate and said TFT substrate, corresponding to certain portions of said black matrix layer and configured to protect said alignment layer from damage due to external pressure.

Said structure may include a column spacer array comprising a first group of column spacers that have a first height, a second group of column spacers that have a second height smaller than said first height, and a means (for example, the means are the first projection pattern 172, second projection pattern 174, the first guide pattern 182, second guide pattern 184 and the groove pattern 190) that corresponds to and faces at least one among said first group of column spacers and second group of column spacers to restrict movement thereof.

Said means may include: a stopper (for example, the stopper is the first projection pattern 172 or second projection pattern 174) having an upper surface in proximity to a distal end surface of one or more column spacers, said upper surface providing frictional resistance to restrict movement of said column spacers upon external pressure being applied thereto.

Said means may include: a holder (for example, the holder is the first guide pattern 182 or the second guide pattern 184) having a recess capable of accommodating a distal end of one or more column spacers, said recess providing spatial containment to restrict movement of said column spacers upon external pressure being applied thereto.

Said stopper may be located above a conductive metal line on said TFT substrate, said conductive metal line being on a common electrode to reduce resistance of said common electrode.

Said holder may be located above a conductive metal line on said TFT substrate, said conductive metal line being on a common electrode to reduce resistance of said common electrode.

Said structure may further include: a third group of column spacers having a third height that is intermediate of said first height and said second height; and said means may further include: a notch (for example, the groove pattern 190) or a holder (for example, the holder is the first guide pattern 182 or the second guide pattern 184) capable of receiving a distal end of one or more column spacers in said third group of column spacers to restrict movement thereof upon external pressure being applied thereto.

In another aspect of the present invention, there is provided a liquid crystal display (LCD) device including: a first substrate in which a black matrix defining a shielding area and an aperture area of each of a plurality of pixels is disposed; a second substrate in which an alignment layer is disposed at a portion corresponding to the shielding area and the aperture area; a plurality of spacers disposed on one of the first and second substrates; and a plurality of means disposed on a substrate different from a substrate in which the plurality of spacers are disposed, and configured to restrict movement distances of the plurality of spacers based on external pressure.

The plurality of spacers may include a first spacer configured to maintain a cell gap between the first substrate and the second substrate, the plurality of means may include a first holder that is more convex than a top of the alignment layer disposed at the portion corresponding to the aperture area, and the convex first holder may restrict movement of the first spacer to the alignment layer, disposed at the portion corresponding to the aperture area, by the external pressure.

The plurality of spacers may include a second spacer configured to maintain a first push gap between the first substrate and the second substrate, the plurality of means may include a second holder that is more convex than the top of the alignment layer disposed at the portion corresponding to the aperture area, and the convex second holder may restrict movement of the second spacer to the alignment layer, disposed at the portion corresponding to the aperture area, by the external pressure.

The plurality of spacers may include a third spacer configured to maintain a second push gap between the first substrate and the second substrate, and the plurality of means may include a third holder that is more concave than the top of the alignment layer disposed at the portion corresponding to the aperture area. When the external pressure is applied, a portion of the third spacer may be inserted into the concave third holder, and the concave third holder may restrict movement of the third spacer to the alignment layer disposed at the portion corresponding to the aperture area.

The plurality of spacers may include a second spacer configured to maintain a first push gap between the first substrate and the second substrate, and the plurality of means may include a second holder that is more concave than the top of the alignment layer disposed at the portion corresponding to the aperture area. When the external pressure is applied, a portion of the second spacer may be inserted into the concave third holder, and the concave third holder may restrict movement of the second spacer to the alignment layer disposed at the portion corresponding to the aperture area.

The plurality of spacers may include a third spacer configured to maintain a second push gap between the first substrate and the second substrate, and the plurality of means may include a third holder that is more concave than the top of the alignment layer disposed at the portion corresponding to the aperture area. When the external pressure is applied, a portion of the third spacer may be inserted into the concave third holder, and the concave third holder may restrict movement of the third spacer to the alignment layer disposed at the portion corresponding to the aperture area.

The first spacer may be narrower in width than the second spacer and may be lower in arrangement density than the second spacer.

The plurality of pixels may be arranged in the order of a blue pixel, a red pixel, and a green pixel, and the first spacer and the second spacer may be arranged in correspondence with a shielding area between the blue pixel and the red pixel.

The plurality of pixels may be arranged in the order of a blue pixel, a red pixel, and a green pixel, and the first spacer and the second spacer may be arranged in correspondence with a shielding area between the red pixel and the green pixel.

The first spacer may be narrower in width than the second spacer and may be lower in arrangement density than the second spacer.

The plurality of pixels may be arranged in the order of a blue pixel, a red pixel, and a green pixel, and the first spacer and the second spacer may be arranged in correspondence with a shielding area between the blue pixel and the red pixel.

The plurality of pixels may be arranged in the order of a blue pixel, a red pixel, and a green pixel, and the first spacer and the second spacer may be arranged in correspondence with a shielding area between the red pixel and the green pixel.

The first push gap may be greater than the second push gap.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus comprising: a color filter (CF) substrate having a black matrix layer; a thin-film transistor (TFT) substrate having a TFT and an alignment layer; and a structure, between said CF substrate and said TFT substrate, and configured to protect said alignment layer from damage due to external pressure, wherein said structure comprises a column spacer array comprising a first group of column spacers that have a first height to maintain a cell gap between said CF substrate and said TFT substrate, a second group of column spacers that have a second height smaller than said first height to maintain a push gap between said CF substrate and said TFT substrate to protect said first group of column spacers from being collapsed due to excessive touch pressure, and a means covered by said alignment film and protruding toward said CF substrate to face at least one among said first group of column spacers and second group of column spacers, wherein said means comprises a holder having a recess capable of accommodating a distal end of one or more column spacers among said first group of column spacers and second group of column spacers, said recess providing spatial containment to restrict movement of said column spacers upon external pressure being applied thereto, and wherein said holder is located above at least one conductive metal line on said TFT substrate, said at least one conductive metal line being on a common electrode to reduce resistance of said common electrode.

2. The apparatus of claim 1, wherein said structure is located on an area in which a plurality of pixels are defined, and
wherein a width of said first group of column spacers is wider than a width of said means.

3. The apparatus of claim 1, wherein said means further comprises:
a stopper having an upper surface in proximity to a distal end surface of one or more column spacers, said upper surface providing frictional resistance to restrict movement of said column spacers upon external pressure being applied thereto.

4. The apparatus of claim 3, wherein said stopper is located above a conductive metal line on said TFT substrate, said conductive metal line being on a common electrode to reduce resistance of said common electrode.

5. The apparatus of claim 1, wherein said structure further comprises: a third group of column spacers having a third height that is intermediate of said first height and said second height; and said means further comprises: a notch capable of receiving a distal end of one or more column spacers in said third group of column spacers to restrict movement thereof upon external pressure being applied thereto.

6. A liquid crystal display (LCD) device comprising:
a first substrate in which a black matrix defining a shielding area and an aperture area of each of a plurality of pixels is disposed;
a second substrate in which an alignment layer is disposed at a portion corresponding to the shielding area and the aperture area;
a plurality of spacers disposed on one of the first and second substrates; and
a plurality of means disposed on a substrate different from a substrate in which the plurality of spacers are disposed, the plurality of means protruding toward the substrate having the plurality of spacers and configured to restrict movement distances of the plurality of spacers,
wherein the plurality of spacers comprise a first spacer having a first height to maintain a cell gap between the first substrate and the second substrate, and a second spacer having a second height smaller than the first height to maintain a first push gap between the first substrate and the second substrate to protect the first group of column spacers from being collapsed due to excessive touch pressure,
wherein the plurality of means comprises at least one conductive metal line, said at least one conductive metal line being on a common electrode to reduce resistance of said common electrode, and is protruding toward said CF substrate by said at least one conductive metal line,
wherein the plurality of means comprises a first holder that is located above said at least one conductive metal line and is more convex than a top of the alignment layer disposed at the portion corresponding to the aperture area, and
wherein the first holder restricts movement of the first spacer to the alignment layer, disposed at the portion corresponding to the aperture area, by external pressure.

7. The LCD device of claim 6, wherein,
the plurality of means comprise a second holder that is more convex than the top of the alignment layer disposed at the portion corresponding to the aperture area, and
the convex second holder restricts movement of the second spacer to the alignment layer, disposed at the portion corresponding to the aperture area, by the external pressure.

8. The LCD device of claim 7, wherein,
the plurality of spacers comprise a third spacer configured to maintain a second push gap between the first substrate and the second substrate,
the plurality of means comprise a third holder that is more concave than the top of the alignment layer disposed at the portion corresponding to the aperture area, and
when the external pressure is applied, a portion of the third spacer is inserted into the concave third holder, and the concave third holder restricts movement of the third spacer to the alignment layer disposed at the portion corresponding to the aperture area.

9. The LCD device of claim 7, wherein,
the plurality of pixels are arranged in the order of a blue pixel, a red pixel, and a green pixel, and
the first spacer and the second spacer are arranged in correspondence with a shielding area between the blue pixel and the red pixel.

10. The LCD device of claim 7, wherein,
the plurality of pixels are arranged in the order of a blue pixel, a red pixel, and a green pixel, and
the first spacer and the second spacer are arranged in correspondence with a shielding area between the red pixel and the green pixel.

11. The LCD device of claim 6, wherein,
the plurality of means comprise a second holder that is more concave than the top of the alignment layer disposed at the portion corresponding to the aperture area, and
when the external pressure is applied, a portion of the second spacer is inserted into the concave second holder, and the concave second holder restricts movement of the second spacer to the alignment layer disposed at the portion corresponding to the aperture area.

12. The LCD device of claim 11, wherein,
the plurality of spacers comprise a third spacer configured to maintain a second push gap between the first substrate and the second substrate, the plurality of means comprise a third holder that is more concave than the top of the alignment layer disposed at the portion corresponding to the aperture area, and when the external pressure is applied, a portion of the third spacer is inserted into the concave third holder, and the concave third holder restricts movement of the third spacer to the alignment layer disposed at the portion corresponding to the aperture area.

13. The LCD device of claim 11, wherein, the plurality of pixels are arranged in the order of a blue pixel, a red pixel, and a green pixel, and the first spacer and the second spacer are arranged in correspondence with a shielding area between the blue pixel and the red pixel.

14. The LCD device of claim 11, wherein, the plurality of pixels are arranged in the order of a blue pixel, a red pixel, and a green pixel, and the first spacer and the second spacer are arranged in correspondence with a shielding area between the red pixel and the green pixel.

15. The LCD device of claim 6, wherein the first spacer is narrower in width than the second spacer and is wider in width than the means.

\* \* \* \* \*